United States Patent
Xiong et al.

(10) Patent No.: US 10,555,322 B2
(45) Date of Patent: Feb. 4, 2020

(54) LOW LATENCY CONTENTION BASED SCHEDULING REQUEST

(71) Applicant: INTEL IP CORPORATION, Santa Clara, CA (US)

(72) Inventors: Gang Xiong, Portland, OR (US); Seunghee Han, San Jose, CA (US); Yushu Zhang, Beijing (CN); Yuan Zhu, Beijing (CN); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 7 days.

(21) Appl. No.: 15/575,320

(22) PCT Filed: Dec. 24, 2015

(86) PCT No.: PCT/US2015/000407
§ 371 (c)(1),
(2) Date: Nov. 17, 2017

(87) PCT Pub. No.: WO2016/204713
PCT Pub. Date: Dec. 22, 2016

(65) Prior Publication Data
US 2018/0152950 A1      May 31, 2018

Related U.S. Application Data

(60) Provisional application No. 62/181,581, filed on Jun. 18, 2015.

(51) Int. Cl.
*H04W 72/08*      (2009.01)
*H04L 5/00*       (2006.01)
(Continued)

(52) U.S. Cl.
CPC ......... *H04W 72/085* (2013.01); *H04L 5/0051* (2013.01); *H04L 5/0053* (2013.01);
(Continued)

(58) Field of Classification Search
CPC . H04W 72/0406–042; H04W 72/0446; H04W 72/0453; H04W 72/1278–1289; H04L 5/0016; H04L 5/0048–0055
See application file for complete search history.

(56) References Cited

U.S. PATENT DOCUMENTS 9,185,722 B2    11/2015  Larmo et al.
9,295,077 B2     3/2016  Guo
(Continued)

FOREIGN PATENT DOCUMENTS

WO   WO 2007148927 A1   12/2007
WO   WO 2014019161 A1    2/2014
WO   WO 2016186698 A1   11/2016

OTHER PUBLICATIONS

3GPP TS 36.213; "3$^{rd}$ Generation Partnership Project; Technical Specification Group Radio Access Network; Evolved Universal Terrestrial Radio Access (E-UTRA); Physical Layer Procedures;" (Mar. 2015); 239 pages; V12.5.0; (Release 12).
(Continued)

*Primary Examiner* — Pao Sinkantarakorn
(74) *Attorney, Agent, or Firm* — Thorpe North & Western

(57) ABSTRACT

Technology for decreasing latency for contention based scheduling request (SR) transmission is disclosed. A user equipment (UE) can process, for transmission to an enhanced node B (eNB), a DeModulation Reference Signal (DM-RS) that is randomly selected from a set of configured DM-RS sequences or configured by the eNB. The UE can select an SR transmission resource as a function of a DM-RS sequence index or cell identification (ID) based on a pre-
(Continued)

defined mapping rule. The UE can process, for transmission to the eNB, a SR message having a buffer status report (BSR) and UE identification (UE-ID) information on the selected SR transmission resource.

27 Claims, 16 Drawing Sheets

(51) Int. Cl.
*H04W 72/04* (2009.01)
*H04W 72/12* (2009.01)

(52) U.S. Cl.
CPC ... *H04W 72/0413* (2013.01); *H04W 72/0446* (2013.01); *H04W 72/1284* (2013.01); *H04L 5/0016* (2013.01)

(56) References Cited

U.S. PATENT DOCUMENTS

| | | |
|---|---|---|
| 9,301,316 B2 | 3/2016 | Moulsley et al. |
| 2014/0204800 A1 | 7/2014 | Moulsley |
| 2016/0100430 A1* | 4/2016 | Dabeer .............. H04W 72/042 370/329 |
| 2017/0086219 A1 | 3/2017 | Lee et al. |
| 2017/0208610 A1 | 7/2017 | Tang et al. |
| 2017/0215201 A1* | 7/2017 | Kim ..................... H04L 5/0055 |
| 2018/0227938 A1 | 8/2018 | Lee et al. |

OTHER PUBLICATIONS

3GPP TS 36.321; "3$^{rd}$ Generation Partnership Project; Technical Specification Group Radio Access Network; Evolved Universal Terrestrial Radio Access (E-UTRA); Medium Access Control (MAC) Protocol Specification;" (Mar. 2015); 77 pages; V12.5.0; (Release 12).

LG Electronics Inc.; "Potential Improvement Area for Latency Reduction;" 3GPP TSG R2-152293; (May 25-29, 2015); 4 pages; RAN WG2 Meeting #90, Fukuoka, Japan; Agenda 7.11 (FS_LTE_LATRED).

International Preliminary Report on Patentability dated Dec. 19, 2017, for International Application No. PCT/US2015/000407, filed Dec. 24, 2015; 8 pages.

* cited by examiner

400

410 — UE randomly selects one DM-RS sequence from a set of configured DeModulation Reference Signal (DM-RS) sequences and transmits the DM-RS sequences 420 — UE selects one SR transmission resource as a function of DM-RS sequence index and/or cell ID based on predefined mapping rule 430 — UE transmits the SR message which includes the BSR and UE ID information on the selected resource

FIG. 4

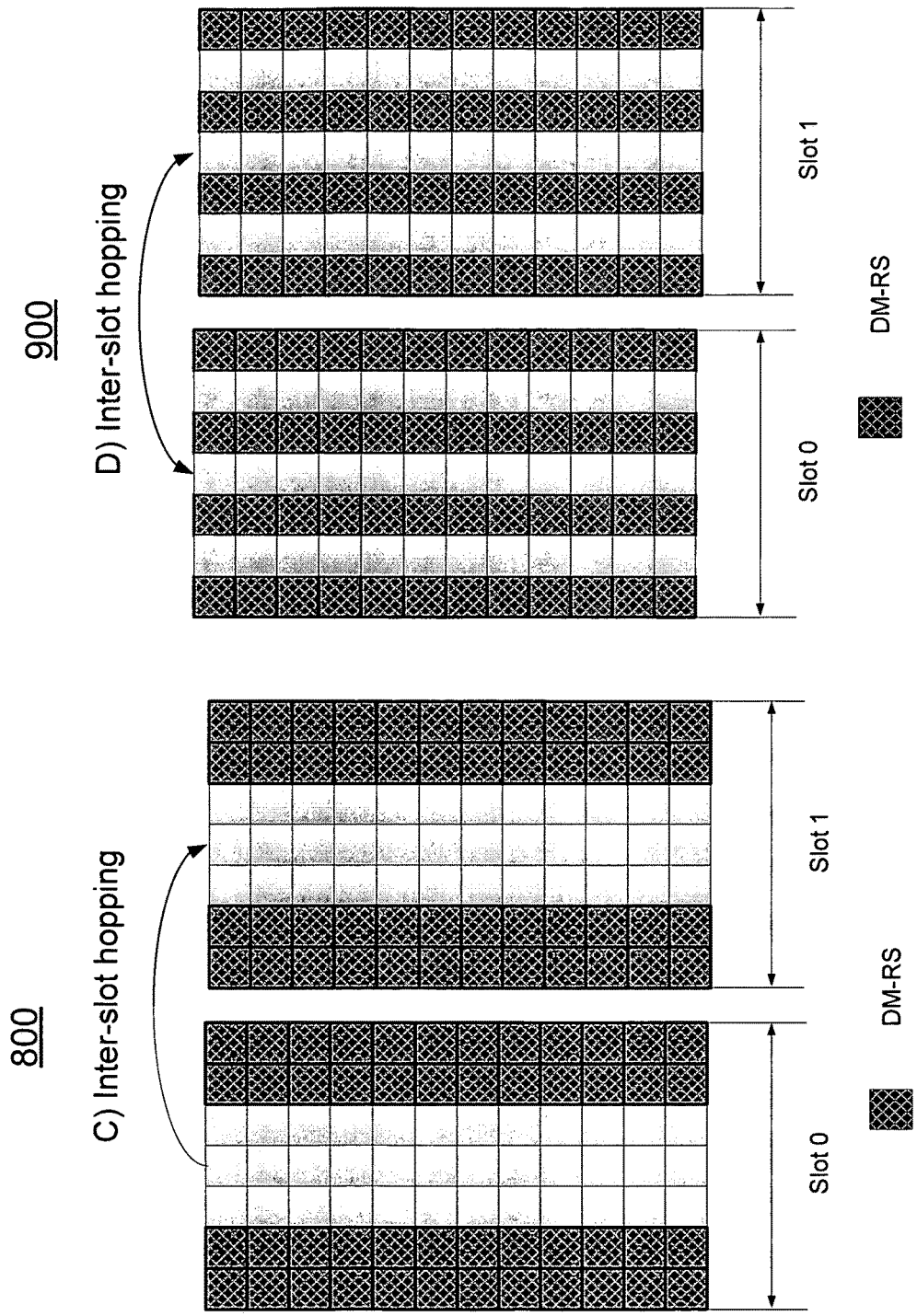

LOW LATENCY CONTENTION BASED SCHEDULING REQUEST

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In 3GPP LTE, an uplink can be established using a physical random access channel (PRACH). Data can be transmitted from the eNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

In a 3GPP LTE system, a UE is configured to transmit a scheduling request (SR) to acquire resources for its uplink transmission. However, transmitting the SR using current methods via the PUCCH or PRACH can have relatively large delays. These delays can increase the latency of the communication system.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates a flow chart for contention based scheduling request (SR) transmission in accordance with an example;

FIG. 8 illustrates an additional example of DeModulation Reference Signal (DM-RS) transmission resource mapping in accordance with an example;

FIG. 9 illustrates an additional example of DeModulation Reference. Signal (DM-RS) transmission resource mapping in accordance with an example;

Figure 1:
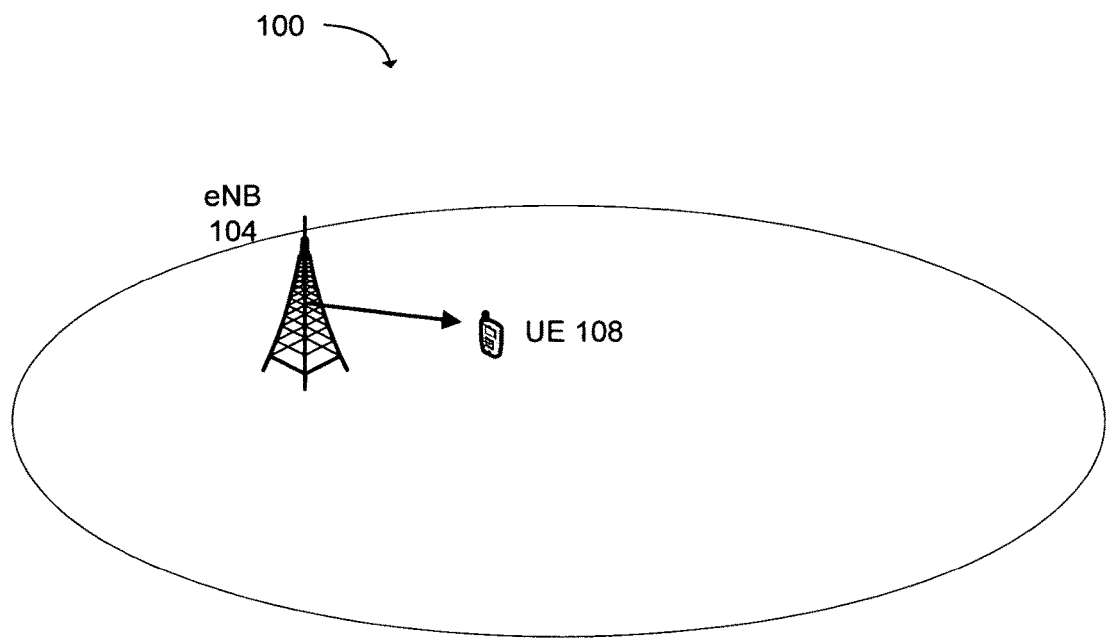
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, 3GPP radio access network (RAN) LTE system can include an evolved universal terrestrial radio access network (E-UTRAN), which can include a plurality of evolved Node-Bs (eNBs) and communicates with a plurality of mobile stations, also referred as user equipment (UEs). The radio protocol stacks of E-UTRAN are given including a radio resource control layer (RRC), a packet data convergence protocol layer (PDCP), a radio link control layer (RLC), a media access control layer (MAC), and a physical layer (PHY).

In order to utilize shared channel (SCH) resources, when sharing resources between UEs, a MAC in an eNB can dynamically assign downlink shared channel (DL-SCH) or uplink shared channel (UL-SCH) resources by physical downlink control channel (PDCCH) signaling. In one example, the PDCCH can include a cell radio network temporary identifier (C-RNTI) or other type of identifier to allocate physical layer resources depending on traffic volume, quality of service (QoS) constraints of each UE, and associated radio bearers.

A scheduling request (SR) can be used by a UE for requesting UL resources. The SR can be triggered when the UE does not have any UL resource allocated for the current transmission time interval (TTI). The TTI is the duration of a transmission on a radio link. In one example, a 3GPP LTE Rel. 12 TTI can comprise a single OFDMA subframe, with a duration of 1 millisecond (ms). A User Equipment (UE) can transmit the scheduling request (SR) to acquire UL resources for the UL transmission. The UE can transmit the SR transmission by 1) a physical uplink control channel (PUCCH) in a configured subframe or 2) a physical random access channel (PRACH) in a contention based communication. However, both the PUCCH transmission and the PRACH transmission are subject to relatively large delays.

Thus, the present technology is provided to support mission critical Machine Type Communication (MTC) in existing LTE systems and 5G wireless technology systems to provide increased efficiency and reliability for connectivity with a guaranteed low latency and availability and reliability-of-service. Accordingly, in one aspect, the present technology provides a solution for contention based scheduling request (SR) for low latency applications.

In one aspect, a technology is provided for contention based scheduling request (SR) transmission. A user equipment (UE) can transmit, to an enhanced node B (eNB), a DeModulation Reference Signal (DM-RS) that is randomly selected from a set of configured DM-RS sequences or configured by the eNB. The UE can select an SR transmission resource as a function of a DM-RS sequence index or cell identification (ID) based on a predefined mapping rule. The UE can process, for transmission to the eNB, a SR message having a buffer status report (BSR) and UE identification (UE-ID) information on the selected SR transmission resource.

In one aspect, a technology is provided for contention based scheduling request (SR) transmission. A user equipment (UE) can randomly select a DeModulation Reference Signal (DM-RS) sequence from a set of configured DM-RS sequences. The UE can process, for transmission, the randomly selected DM-RS sequence. The UE can select a SR transmission resource as a function a DM-RS sequence index and/or cell identification (ID) based on a predefined mapping rule. The UE can generate, for transmission, a SR message on the selected SR transmission resource having a buffer status report (BSR) and UE ID information.

In one aspect, a technology is provided for contention based scheduling request (SR) transmission. An eNodeB can configure a set of configured DM-RS sequences for receiving from the UE a DeModulation Reference Signal (DM-RS). The eNodeB can detect the DeModulation Reference Signal (DM-RS), received, from the UE, that is randomly selected from the set of configured DM-RS sequences. The eNodeB can process an SR message (received from the UE) having a buffer status report (BSR) and UE ID information on a SR transmission resource selected from a function of a DM-RS sequence index and/or cell identification (ID) based on a predefined mapping rule. The eNodeB can perform coherent decoding of the SR message.

FIG. 1 illustrates a mobile communication network within a cell 100 having an evolved node B (eNB) with a mobile device. FIG. 1 illustrates an eNB 104 that can be associated with an anchor cell, macro cell or primary cell. Also, the cell 100 can include mobile device, such as, for example, a User equipment (UE or UEs) 108 that can be in communication with the eNB 104. The eNB 104 may be a station that communicates with the UE 108 and may also be referred to as a base station, a node B, an access point, and the like. The eNB 104 can be a high transmission power eNB, such as a macro eNB, for coverage and connectivity. The eNB 104 can be responsible for mobility and can also be responsible for radio resource control (RRC) signaling. User equipment (UE or UEs) 108 can be supported by the macro eNB 104.

The eNB 104 may provide communication coverage for a particular geographic area. In 3GPP, the term "cell" can refer to a particular geographic coverage area of eNB and/or an eNB subsystem serving the coverage area, depending on the context in which the term is used.

Figure 2:
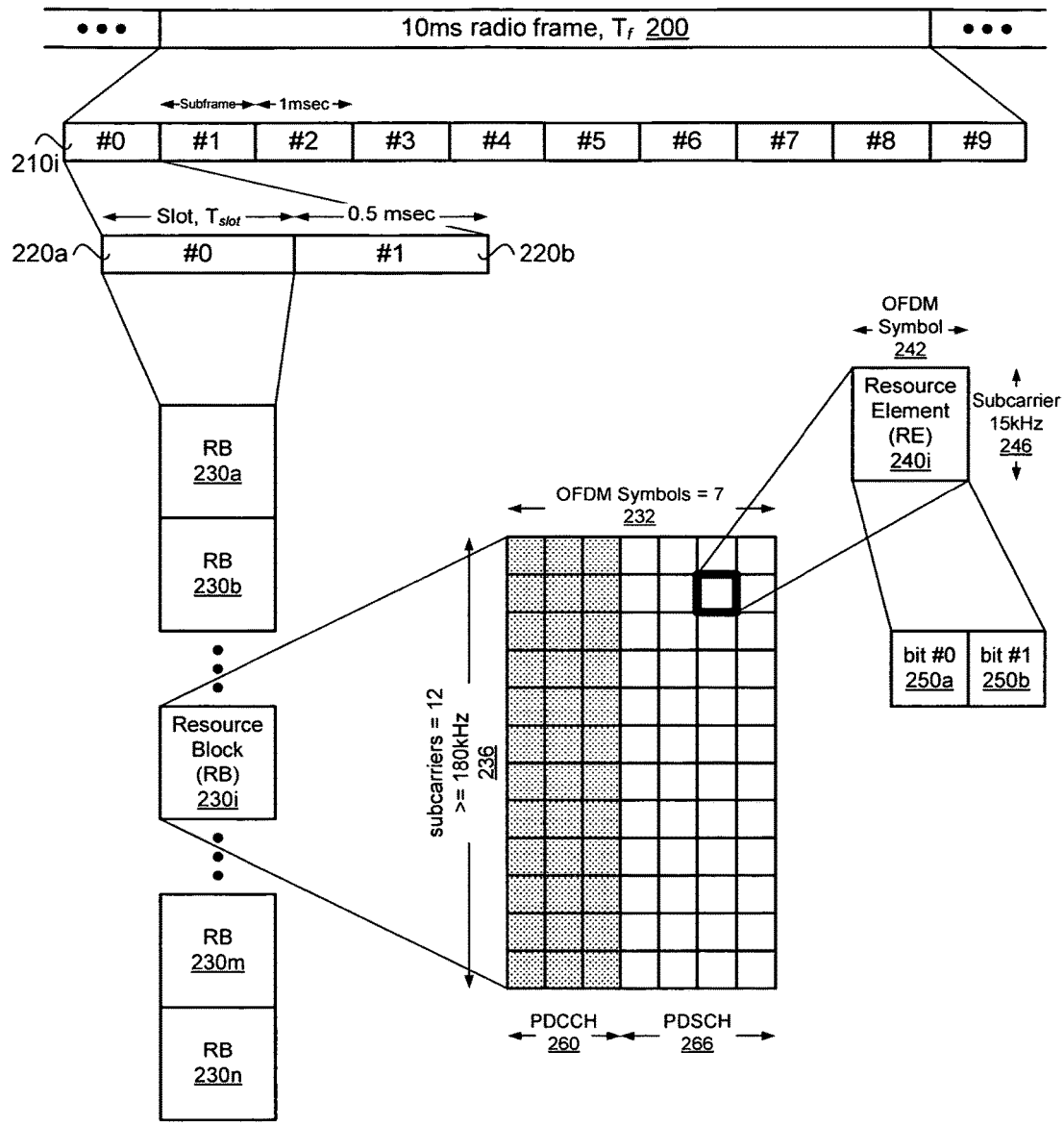
FIG. 2 illustrates a diagram of radio frame resources (e.g., a resource grid) for a downlink (DL) transmission including a legacy physical downlink control channel (PDCCH) in accordance with an example.

FIG. 2 illustrates a diagram of radio frame resources (e.g., a resource grid) for a downlink (DL) transmission including a legacy physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210$i$ that are each 1 ms long. Each subframe can be further subdivided into two slots 220$a$ and 220$b$, each with a duration, Tslot, of 0.5 ms. The first slot (#0) 220$a$ can include a legacy physical downlink control channel (PDCCH) 260 and/or a physical downlink shared channel (PDSCH) 266, and the second slot (#1) 220$b$ can include data transmitted using the PDSCH. In one aspect, at least part of the architectural design of the radio frame 200 can also be applicable for a single carrier frequency division multiple access (SC-FDMA) in an uplink (UL) transmission.

Each slot for a component carrier (CC) used by the node and the wireless device can include multiple resource blocks (RBs) 230$a$, 230$b$, 230$i$, 230$m$, and 230$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

In one example embodiment, each RB (physical RB or PRB) 230$i$ can include 12 subcarriers 236 with a bandwidth of 15 kHz per subcarrier (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240$i$ using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250$a$ and 250$b$ of information in the case of quadrature phase-shift keying (QPSK) modulation. Other types of modulation can be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNB to the UE, or the RB can be configured for an uplink transmission from the UE to the eNB.

The example of FIG. 2 is not intended to be limiting. Rather, it is just one example of an OFDMA radio frame structure. Future 5G systems may have a different number of subcarriers and OFDM symbols that can be used to construct the OFDMA subframe 210$i$ and radio frame 200. Each OFDM symbol 232 may have a different time, and each subcarrier may have a different frequency bandwidth. A shorter subframe can enable a communication scheme with lower latency.

As previously stated, a UE can transmit the SR transmission by 1) a physical uplink control channel (PUCCH) in a configured subframe or 2) a physical random access channel (PRACH). However, both the PUCCH transmission and the PRACH transmission can be subject to large or long time delays. For example, using a PUCCH, a UE can be configured to wait for the UE's configured SR transmission subframe in order to send an SR using the PUCCH. The UE can be configured to wait until the UE's uplink grant arrives in order to send a buffer status report (BSR). Then the UE can wait for receiving the uplink grant in order to transmit a first uplink data transmission. In addition, using a PUCCH for issuing a SR may not be applicable for all UEs since an eNB may not configure a setup operation for an SR configuration for each UE due to resource limitation. Alternatively, using a PRACH for issuing an SR can also have a large delay as illustrated in FIG. 3.

Figure 3:
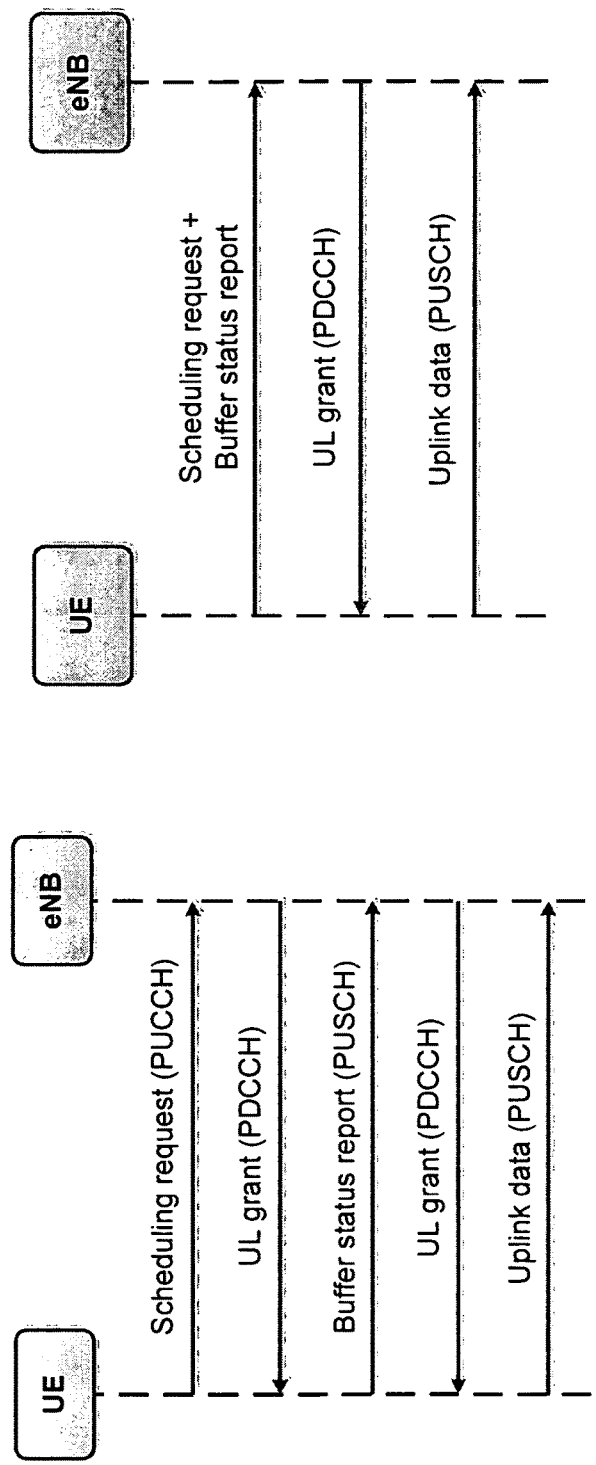
FIG. 3 depicts a legacy Uplink (UL) data transmission compared to a low latency UL data transmission in accordance with an example.

FIG. 3 compares A) a legacy Uplink (UL) data transmission with B) a low latency Uplink (UL) data transmission of the present invention. For example, in A) a legacy UL data transmission includes a total of 5 messages in the entire UL data transmission procedure. For example, when the UE intends to transmit the data in the uplink, the UE will 1) request a resource using PUCCH format 1 for scheduling request (SR). After successful detection of the SR, eNB 2) transmits the PDCCH with downlink control information (DCI) format containing an uplink grant to allocate an uplink transmission resource. Subsequently, the UE 3) sends a buffer status report (BSR) on the PUSCH in the allocated uplink transmission resource. The BSR can be carried in a media access control (MAC) protocol data unit (PDU), which can be used to inform eNB on the amount of the data in UE's buffer to be transmitted. Based on the BSR information, the eNB can 4) allocate the appropriate resource and modulation and coding scheme (MCS), which can be included in the uplink grant. After receiving the uplink grant, UE can 5) transmit the uplink data on the PUSCH.

However, in order to reduce the latency, the SR transmission and reception procedure of legacy UL data transmission can be simplified. In one example, the SR procedure can be simplified by reducing the 5 total messages to 3 total messages. In B) of FIG. 3, the user equipment (UE) can send the SR and BSR together to the eNB in a dedicated resource using the PUCCH. Thus, two steps of A) of FIG. 3 for the BSR in the uplink and corresponding UL grant in the downlink can be eliminated, thereby reducing the latency substantially for the uplink data transmission. That is, the UE can 1) send the SR and BSR together to the eNB in a dedicated resource using the PUCCH. The UE can 2) receive from the eNB 3) the allocated resource and modulation and coding scheme (MCS), which can be included in the uplink grant. After receiving the uplink grant, UE can 3) transmit the uplink data on the PUSCH.

In other words, the present technology provides for contention based SR transmission to reduce the latency for uplink data transmission. In particular, the technology provides a solution for contention based SR transmission, a configuration of contention based SR region, a generation of DeModulation Reference Symbols (DM-RS) for the contention based SR transmission, including resource mapping and DM-RS sequence generation, and a SR resource mapping scheme and selection of SR transmission resource.

Turning now to FIG. 4, a procedure for contention based SR transmission 400 is depicted. In one aspect, the UE can randomly select one DeModulation Reference Signal (DM-RS) sequence from a set of configured DM-RS sequences and process, for transmission, the randomly selected DM-RS sequence, as in action 410. The UE can select one SR transmission resource as a function a DM-RS sequence index and/or cell identification (ID) based on a predefined mapping rule, as in action 420. The UE can transmit a SR message, which can include a buffer status report (BSR) and a UE ID information, on the selected SR transmission resource.

In one aspect, relating to FIG. 4, an eNB can first perform a detection operation on the DM-RS sequence for contention based SR transmission. Upon successful detection of the DM-RS sequence, the eNB can estimate a channel and perform coherent decoding of the SR message. The DM-RS sequence detection can be more robust than decoding of the SR message. For example, the signal existence detected by DM-RS sequence detection operation can represent a POSITIVE SR (e.g., the POSITIVE SR indicating the DM-RS sequence is detected) and the SR transmission contents can include the BSR. That is, the SR messages can be used to carry the BSR information.

Contention Based SR Configuration

In one aspect, a dedicated resource in the frequency domain may be used for contention based SR transmission, such as, for example, to avoid a collision of a legacy PUCCH transmission. In one aspect, a contention based SR transmission region can be configured by higher layers in a cell-specific manner via a master information block (MIB), a system information block (SIB), and/or a UE-specific dedicated radio resource control layer (RRC) signalling.

Figure 5:
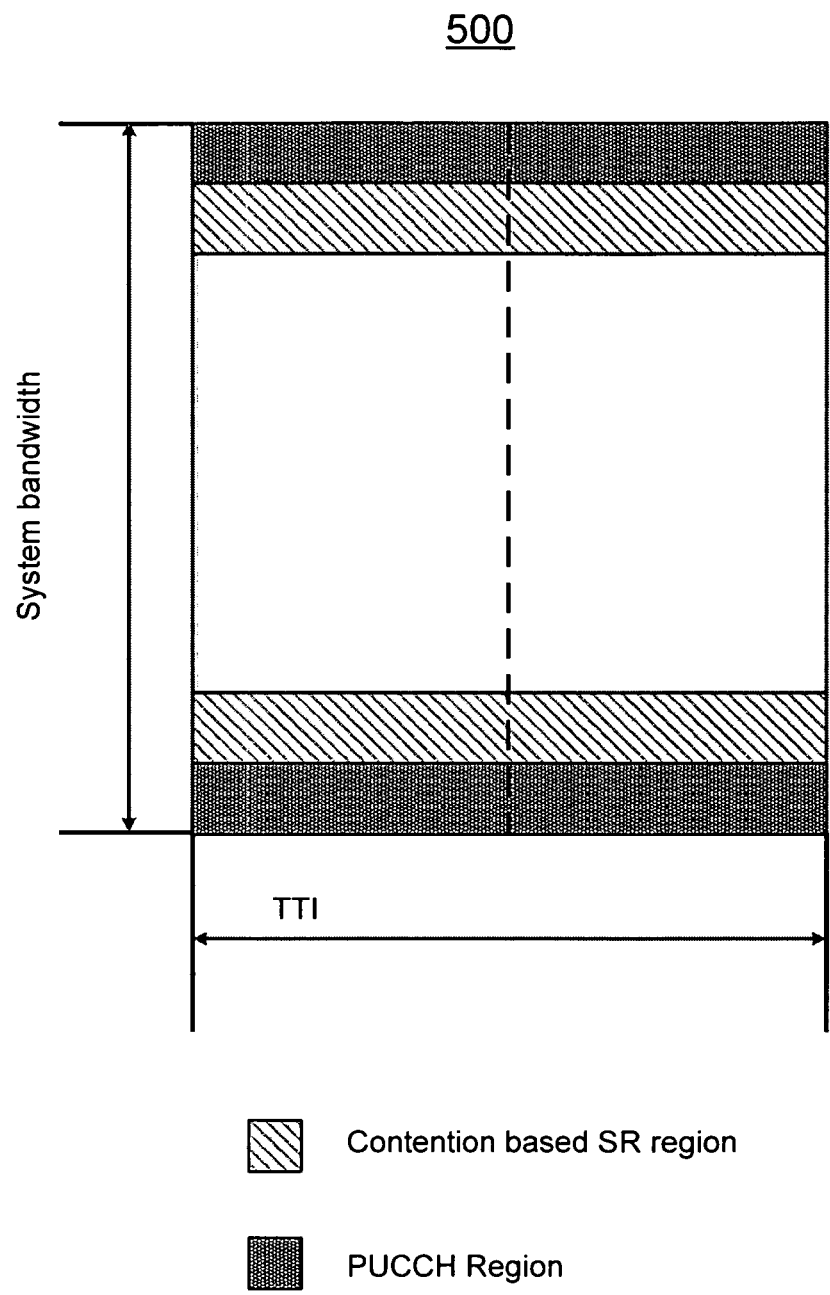
FIG. 5 illustrates a contention based scheduling request (SR) transmission region in accordance with an example.

Turning now to FIG. 5 a contention based scheduling request (SR) transmission region is depicted. In one aspect, a contention based SR region can be located adjacent to a PUCCH region. Similar to the PUCCH, inter-slot frequency hopping can be applied for the SR transmission of contention based SR to exploit the benefit of frequency diversity.

In one aspect, in the time domain, each instances of the contention based SR transmission can be configured in either a UE specific and/or cell specific manner. In the UE specific configuration scenario, the contention based SR transmission instances can be configured via a dedicated RRC signalling, while in the cell specific scenario, the contention based SR transmission instances can be configured via the MIB, the SIB, and/or the dedicated RRC signalling. It should be noted that contention based SR transmission instances can be defined as the uplink subframes satisfying the following equation:

$$(10 \times n_f + \lfloor n_s/2 \rfloor - N_{OFFSET,CB\_SR}) \mod CB\_SR_{PERIODICITY} = 0, \quad (1),$$

where $n_f$ and $n_s$ can be radio frame numbers and slot number, $N_{OFFSET}$,CB_SR can be the contention based SR subframe offset, and CB_SR$_{PERIODICITY}$ can be the contention based SR transmission periodicity.

In one aspect, the $N_{OFFSET}$,CB_SR and CB_SR$_{PERIODICITY}$ can be defined by the parameter $I_{CB\_SR}$, which can be given in the Table, as illustrated below. Also, other values of $I_{CB\_SR}$, $N_{OFFSET}$,CB_SR and CB_SR$_{PERIODICITY}$ can be easily extended from the examples as shown in the Table.

TABLE 1

Contention based SR periodicity and subframe offset configuration

| Contention based SR configuration Index $I_{CB\_SR}$ | Contention based SR periodicity CB_SR$_{PERIODICITY}$ (ms) | SR subframe offset $N_{OFFSET, CB\_SR}$ |
|---|---|---|
| 0-4 | 5 | $I_{CB\_SR}$ |
| 5-14 | 10 | $I_{CB\_SR}$-5 |
| 15-34 | 20 | $I_{CB\_SR}$-15 |
| 35-74 | 40 | $I_{CB\_SR}$-35 |
| 75-154 | 80 | $I_{CB\_SR}$-75 |

Contention Based SR Design: DM-RS Resource Mapping

Figure 7:
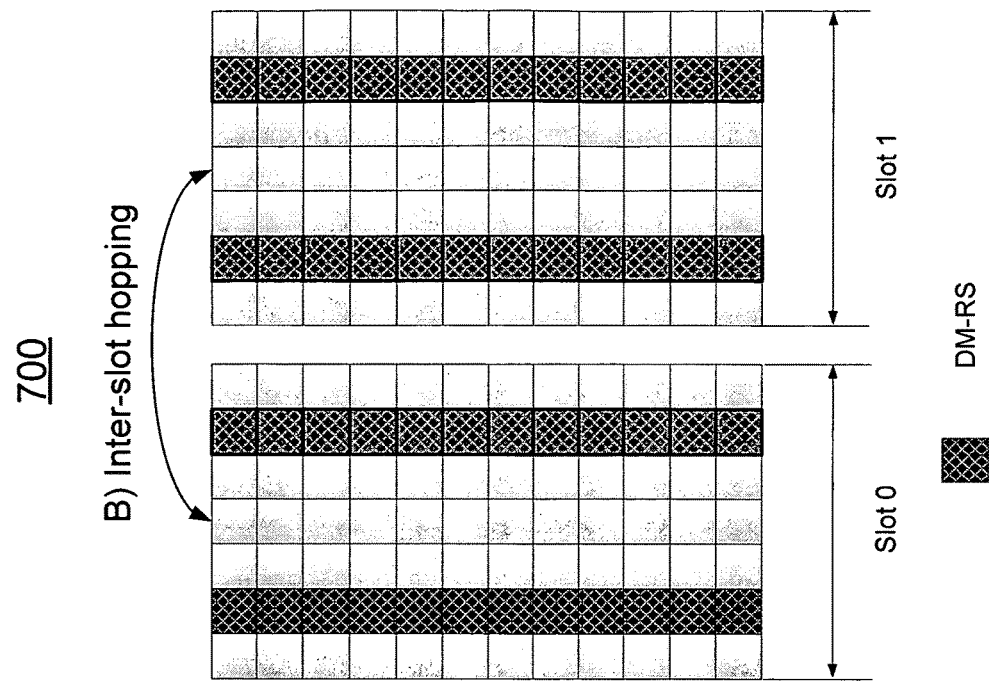
FIG. 7 illustrates an additional example of DeModulation Reference Signal (DM-RS) transmission resource mapping in accordance with an example.
Figure 6:
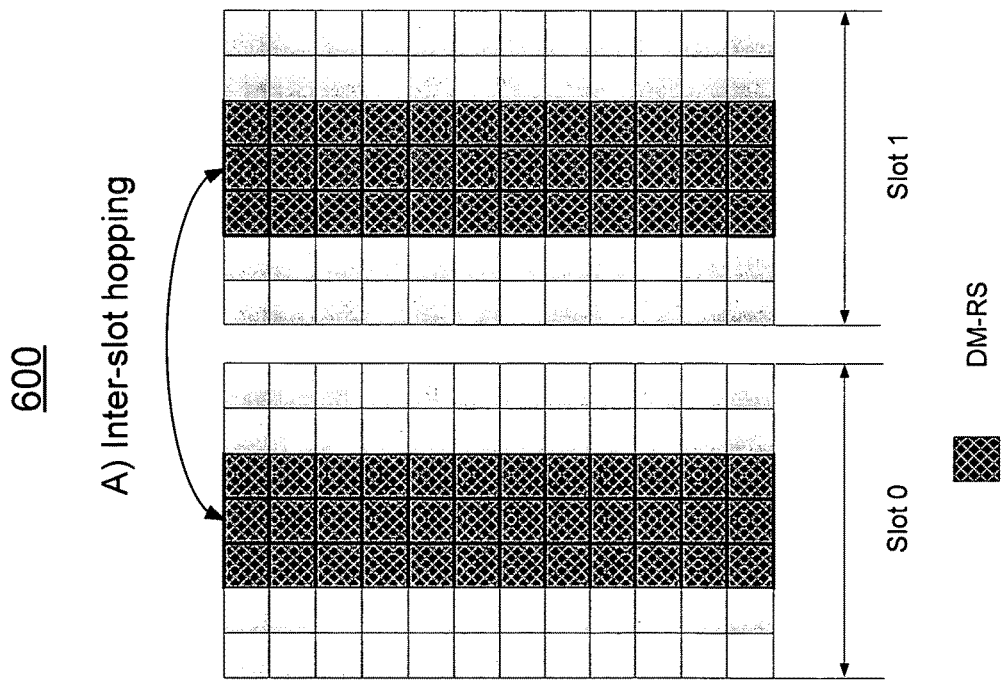
FIG. 6 illustrates an example of DeModulation Reference Signal (DM-RS) transmission resource mapping in accordance with an example.

Turning now to FIGS. 6-9, four examples of DeModulation Reference Signal (DM-RS) transmission resource mapping options are provided. That is, FIG. 6 represents option 1, FIG. 7 represents option 2, FIG. 8 represents option 3, and FIG. 9 can represent option 4. Options 1-4 can be considered for the resource mapping of the DM-RS symbols.

As depicted in FIG. 6: Option 1, the resource mapping for DM-RS for contention based SR transmission can reuse the resource mapping for physical uplink control channel (PUCCH) format 1, 1a, 1b, as defined by 3rd generation partnership project (3GPP) long term evolution (LTE) Release 12, for resource mapping the DM-RS for transmitting the SR message. More specifically, in each slot (e.g., slot 0 and/or slot 1), the DM-RS can occupy the orthogonal frequency-division multiplexing (OFDM) symbols #2, #3 and #4 for a normal cyclic prefix (CP) scenario. That is, the DM-RS can occupy the OFDM symbols #2, #3 and #4 for a normal cyclic prefix (CP) for each slot.

As depicted in FIG. 7: Option 2, the resource mapping for DM-RS for contention based SR transmission can reuse the resource mapping for physical uplink control channel (PUCCH) format 2, 2a, 2b, and/or 3, as defined by 3rd generation partnership project (3GPP) long term evolution (LTE) Release 12, for resource mapping the DM-RS for transmitting the SR message. More specifically, in each slot (e.g., slot 0 and/or slot 1), the DM-RS can occupy the orthogonal frequency-division multiplexing (OFDM) symbols #1 and #5 for normal CP case.

As depicted in FIG. 8: Option 3, in each slot (e.g., slot 0 and/or slot), the DM-RS can occupy the orthogonal frequency-division multiplexing (OFDM) symbols #0, #1, #2, #5 and #6 for a normal cyclic prefix (CP) for each slot.

As depicted in FIG. 8: Option 4, in each slot (e.g., slot 0 and/or slot 1), the DM-RS can occupy the orthogonal frequency-division multiplexing (OFDM) symbols #0, #2, #4, and #6 for a normal cyclic prefix (CP) for each slot. It should be noted that different number of symbols can be allocated for DM-RS transmission, and also, extended CP scenario can be extended and used in option 1-4 of FIGS. 6-9.

Contention Based SR by Using Variant PUCCH Formats

In one aspect, a contention based SR transmission can be facilitated by PUCCH formats, such as PUCCH formats 1, 1a, 1b, 2, 2a, 2b, and/or 3, as defined by 3rd generation partnership project (3GPP) long term evolution (LTE) Release 12. For example, PUCCH format 2 can carry up to 13 information bits, PUCCH format 3 can carry up to 22 information bits, and PUCCH format 4 (TBD) can carry equal to and/or greater than 100 information bits. If a PUCCH format is used for the contention based SR transmission, a PUCCH format adaptation can be used. That is, a different PUCCH format can be used according to the information bit size.

Contention Based SR Design: DM-RS Generation

In one aspect, DM-RS sequence can be composed of a base sequence, CS index and OCC index. Multiple mutually orthogonal reference signals can be generated by employing different cyclic shifts (CS) of a base sequences, such as Zadoff-Chu sequences for allocations of equal to and/or greater than three (3) physical resource blocks (PRB). Also, multiple mutually orthogonal reference signals can be generated by employing different cyclic shifts (CS) of a base sequences for 1 or 2 PRB allocations and applying orthogonal cover codes (OCC) to a reference-signal transmissions within a subframe.

In one aspect, to minimize latency and implementation cost, the generation of base sequence, including a group and sequence hopping mechanism can follow the legacy LTE specification for PUSCH or PUCCH transmission. It should be noted that when the DM-RS structure for PUCCH format 2, 2a, 2b and 3 is reused, the OCC can be extended to improve the capacity for orthogonal DM-RS sequences. In other words, multiple mutually orthogonal reference signals can be generated by employing different cyclic shifts (CS) of ZC sequence and applying orthogonal cover code (OCC) to the two reference-signal transmissions within a subframe, such as using length-2 orthogonal cover code [1, 1] and [1, −1], as depicted in Table 2. Each orthogonal sequence can be associated with a particular sequence index n_oc. Table 2 illustrates the OCC applied for the DM-RS for normal CP case when two DM-RS sequences are transmitted within one slot.

TABLE 2

Orthogonal sequences [w(0), w(1)]

| Sequence index $n_{oc}$ | Orthogonal sequences [w(0), w(1)] |
| --- | --- |
| 0 | [+1 +1] |
| 1 | [+1 −1] |

Similarly for the resource mapping option 3 and 4 when DM-RS occupies 4 OFDM symbols in each slot, the OCC of length 4 can be applied. Table 1 depicts the OCC applied for the DM-RS for the resource mapping option 3 of FIG. 8 and option 4 of FIG. 9. The orthogonal sequence can be based on length-4 Walsh-Hadamard sequence.

TABLE 1

Orthogonal sequences [w(0), . . . , w(3)]

| Sequence index $n_{oc}$ | Orthogonal sequences [w(0), . . . , w(3)] |
| --- | --- |
| 0 | [+1 +1 +1 +1] |
| 1 | [+1 −1 +1 −1] |
| 2 | [+1 +1 −1 −1] |
| 3 | [+1 −1 −1 +1] |

That is, Table 3 illustrates a set of orthogonal cover codes (OCCs) when a number (K) of DMRS sequences (or symbols) are used within a single subframe is four (i.e., K=4). The orthogonal sequences can be based on a length-4 Walsh-Hadamard code. The orthogonal sequences can be represented as [w(o) . . . W(3)] when K=4. Each orthogonal sequence can be associated with a particular sequence index n_oc. For example, when the sequence index is 0, the orthogonal sequence is [+1 +1 +1 +1]. When the sequence index is 1, the orthogonal sequence is [+1 −1 +1 −1]. When the sequence index is 2, the orthogonal sequence is [+1 +1 −1 −1]. When the sequence index is 3, the orthogonal sequence is [+1 −1 −1 +1].

In one aspect, one or more options can be considered for generating DM-RS sequences. In one aspect, a UE can randomly select a combination of cyclic shifts (CS) and/or orthogonal cover codes (OCC) index for the generation of a DM-RS sequence. A subset of DM-RS sequences can be configured to reduce the DM-RS blind detection complexity. Also, to improve the orthogonality and channel separation especially in the presence of practical impairment, DM-RS sequences having a large CS separation, e.g., a CS difference greater than 1, may be desirable. Also, an orthogonal cover codes (OCC) can be configured. In one aspect, the configuration of the subset of DMRS sequences can be pre-configured and/or semi-statically signaled by the eNB using master information block (MIB), a system information block (SIB), and/or a UE-specific dedicated RRC signalling.

In one aspect, for example, a DM-RS structure based on physical uplink control channel (PUCCH) format 1, 1a, and 1b, 36 unique DMRS configurations can be available by considering 12 cyclic shifts and 3 OCC indices. To maintain sufficient orthogonality between cyclic shifted versions of the same DM-RS base sequence, a UE can select one of the DMRS sequences for the contention based SR message transmission from a subset of DMRS sequences with $n_{CS} \in \{0,4,8\}$ and $n_{oc} \in \{0,1,2\}$, where $n_{CS}$ is the cyclic shift index and $n_{oc}$ is the orthogonal cover code index.

In an additional aspect, an existing parameter for CS distance, represented as "$\Delta_{shift}^{PUCCH}$" as defined in 3rd generation partnership project (3GPP) long term evolution (LTE) Release 12 can be reused. For example, when the CS distance equal to 2 (e.g., $\Delta_{shift}^{PUCCH}=2$), the subset of DM-RS sequences for CS can be defined as $n_{CS} \in \{0,2,4,6,8,10\}$.

In an additional aspect, the DM-RS sequence index, which can be defined as a combination of CS and/or OCC index, can be configured in a UE specific manner via UE dedicated RRC signalling. The DM-RS sequence index for the UE specific configuration can be appropriate for a lightly-loaded system where the number of UEs intended for contention based SR transmission is relatively small.

In an additional aspect, the DM-RS sequence index can carry certain, specified information in the SR transmission message. For example, a CS index can be used to carry X bits in the SR transmission message, where X is a positive integer. The UE can randomly select the OCC index for the generation of DM-RS sequence. In another example, UE can first generate a bit sequence as a function of SR message, where $a=f(b_{SR})$ and a can be a generated bit sequence and $b_{SR}$ can be the bit sequence for a SR transmission message. Subsequently, the UE can select Y bit from a and generates the DM-RS sequence according to Y bit information, where Y is a positive integer.

In one aspect, the DM-RS sequence index can be divided into 2 groups. The first group can indicate a short SR message transmission and the second group can indicate a long SR message transmission. The short SR message can take part resource of one PRB pair and the long SR message can take full resource of one PRB pair. A group threshold configuration can be cell specific and transmitted via RRC signaling.

Contention Based SR Design: SR Resource Mapping

In one aspect, a SR transmission message can include a payload format and transmission scheme defined for contention based SR transmission. The BSR and UE ID can be included in the SR message to allow fast UL access and data transmission.

In one aspect, a resource mapping for the transmission of the SR transmission message depends on a specific SR message payload size. The SR message can be transmitted in a localized or distributed manner. The configuration of localized or distributed SR transmission can be predefined and/or configured via MIB, SIB or dedicated RRC signalling.

Figure 10:
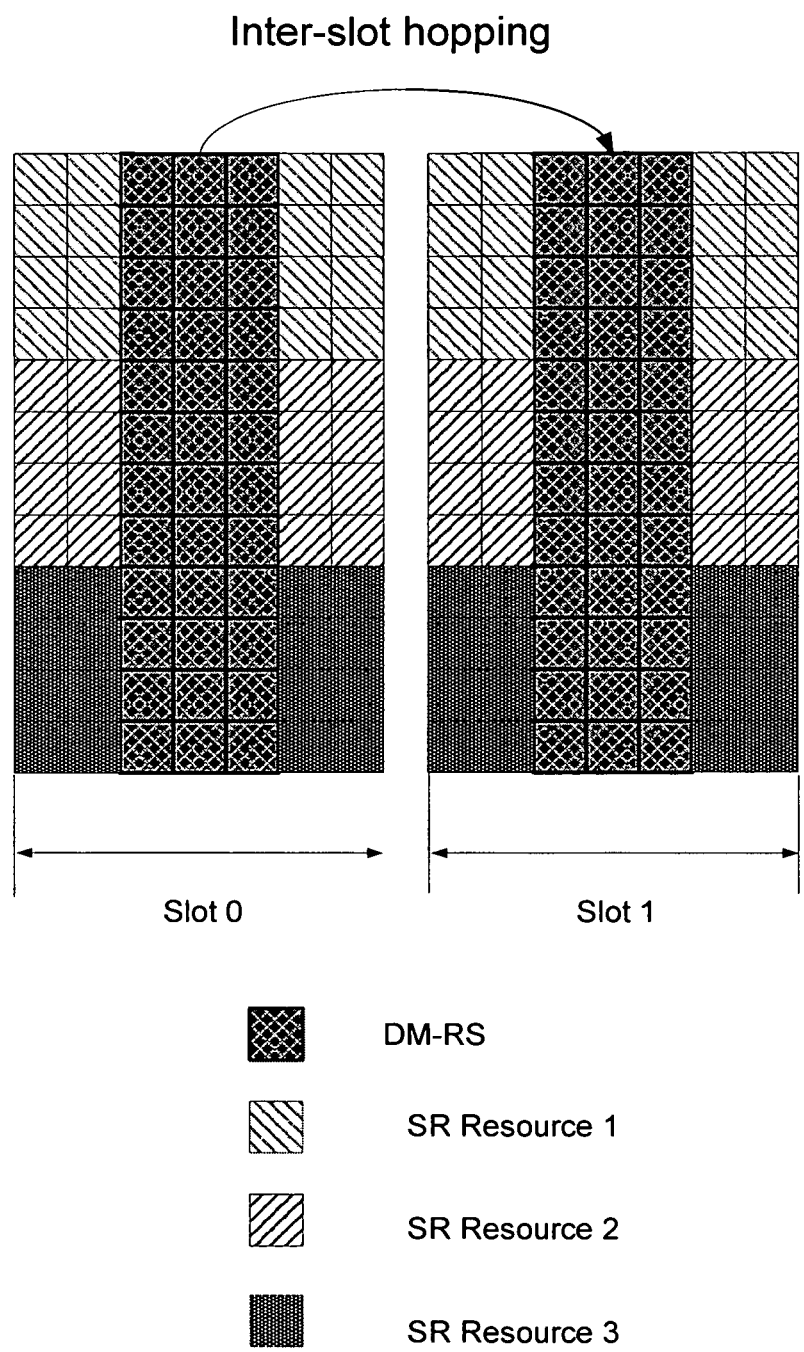
FIG. 10 illustrates an option for localized scheduling request (SR) transmission for the DeModulation Reference Signal (DM-RS) transmission resource mapping of FIG. 6 in accordance with an example.
Figure 11:
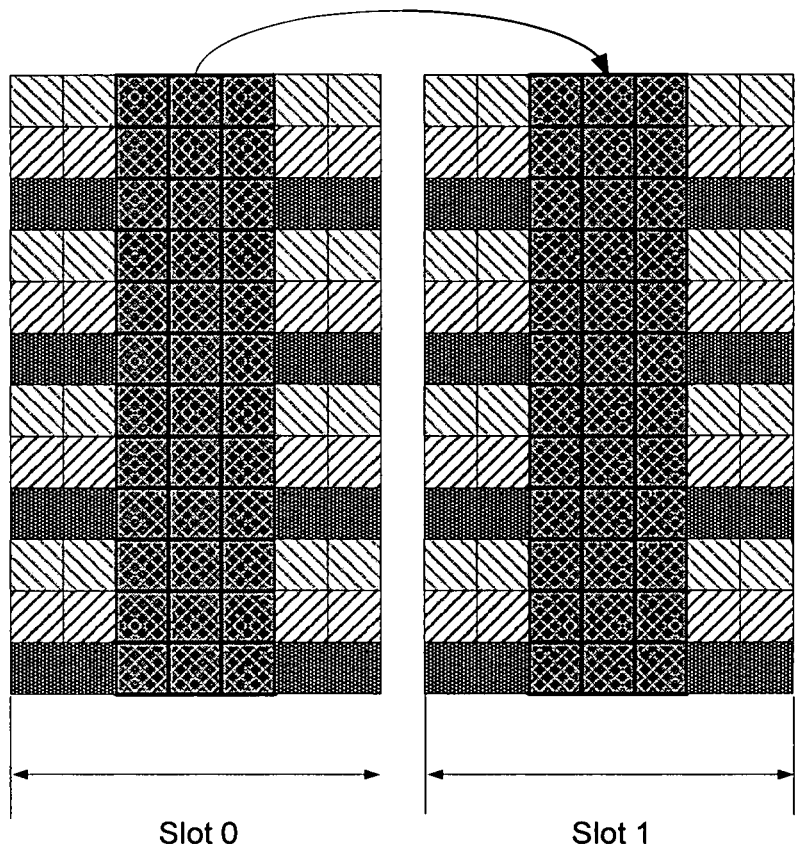
FIG. 11 illustrates an option for distributed scheduling request (SR) transmission for the DeModulation Reference Signal (DM-RS) transmission resource mapping of FIG. 6 in accordance with an example.

Turning now to FIGS. 10 and 11, FIG. 10 illustrates an option for localized scheduling request (SR) transmission for the DeModulation Reference Signal (DM-RS) transmission resource mapping of FIG. 6. FIG. 11 illustrates an option for distributed scheduling request (SR) transmission for the DeModulation Reference Signal (DM-RS) transmission resource mapping of FIG. 6. Both FIGS. 10 and 11 depict the DM-RS, three resources; 1) SR resource 1, 2) SR resource 2, and 3) SR resource 3.

Figure 12:
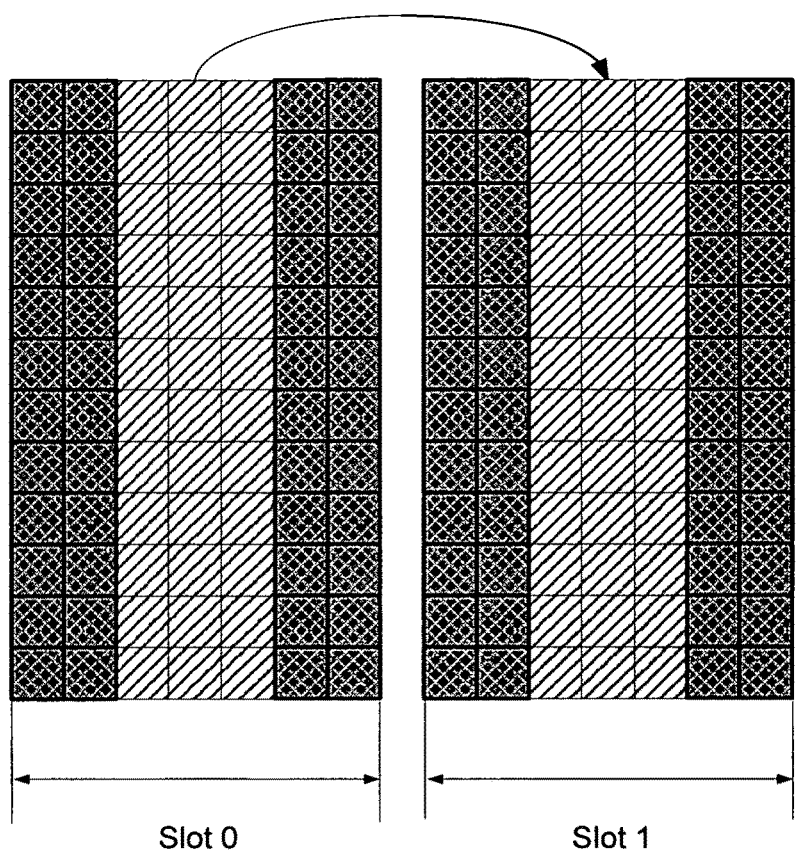
FIG. 12 illustrates an option for distributed scheduling request (SR) transmission for the DeModulation Reference Signal (DM-RS) transmission resource mapping of FIG. 8 in accordance with an example.

In one aspect, in FIGS. 10 and 11, a total number of SR transmission resources in one PRB pair can be 3. The resource mapping protocol can be appropriate for a relatively small payload size, e.g., less than 10 bits, for the transmission of SR message. In an additional aspect, when the payload size of the transmission of SR message is relatively large, one (1) SR transmission resource can be allocated within one PRB pair, as illustrated in FIG. 12. FIG. 12 illustrates one example of SR transmission resource for DM-RS pattern option 3 of FIG. 8. IT should be noted that FIGS. 10-12 can be extended to different payload sizes, other DM-RS patterns, and/or other number of SR transmission resources.

Contention Based SR Design: Selection of SR Transmission Resource

In one aspect, one or more options can be used for the selection of SR transmission resource. In one aspect, a UE can randomly selects one SR transmission resource to transmit the SR message. This scheme may rely on an eNB's implementation to link the SR transmission and DM-RS sequence in order to perform the proper channel estimation for coherent decoding of the SR message.

In an additional aspect, a UE can select one SR transmission resource as a function of DM-RS sequence index, cell ID, PRB index, and/or subframe index used for a SR transmission based on a predefined mapping rule.

In one aspect, a mapping rule can be defined as a function of DM-RS sequence index as follows:

$$I_{SR}=f(I_{DMRS}), \quad (2),$$

where $I_{SR}$ can be the SR transmission resource index, the $I_{SR}=0,1,\ldots,N-1$, where N can be a total number of SR transmission resources (or opportunities) in one PRB pair. $I_{DMRS}$ can be a DM-RS sequence index. In one aspect, a mapping rule can be defined as $$I_{SR}=(a_0 \cdot I_{DMRS}+a_1) \bmod(N), \quad (3),$$

where $a_0$ and $a_1$ are constants, which can be predefined in the specification or configured by higher layers via the MIB, SIB, and/or UE specific dedicated RRC signalling.

In one aspect, the DM-RS sequence index can be represented as a form of CS and/or OCC index. Then, a mapping rule can be defined as:

$$I_{SR}=f(n_{CS}, n_{oc}), \quad (4).$$

In one aspect, a mapping rule can be defined as a function of DM-RS sequence index and cell ID:

$$I_{SR}=f(n_{CS},n_{oc},n_{cell}^{ID}) \quad (5),$$

where $n_{cell}^{ID}$ can be the physical cell ID. For example, the mapping rule can be defined as:

$$I_{SR}=(c_0 \cdot n_{CS}+C_1 \cdot n_{oc}+c_2 \cdot n_{cell}^{ID}+c_3) \bmod(N) \quad (6),$$

where $c_0$, $c_1$, $c_2$ and $c_3$ can be constants, which can be predefined in the specification or configured by higher layers via MIB, SIB and/or UE specific dedicated RRC signalling.

In one aspect, a mapping rule can be defined as a function of DM-RS sequence index, cell ID, a PRB index, and/or subframe index used for the SR transmission, such as:

$$I_{SR}=f(n_{CS},n_{oc},n_{cell}^{ID},n_{PRB},n_{SF}) \quad (7),$$

where $n_{PRB}$ and $n_{SF}$ can be a PRB index and an subframe index used for the SR transmission, respectively. In one aspect, a UE can select one SR transmission resource based on the UE's UE-ID, which can assist to reduce cyclic redundant check (CRC) false detection rate of a SR message. For example, a definition of a SR resource selection can be as follows:

$$I_{SR}=N_{ID}^{UE} \bmod N \quad (8),$$

where "$N_{ID}^{UE}$" refers to UE ID.

In one aspect, a CRC attachment can be for a larger payload information size. Thus, a UE-ID (e.g. C-RNTI) can be either encoded as information bit or masked (scrambled) on top of entire or some parts of CRC bits. If the number of CRC bits is 16 bits, there may be one-to-one mapping in bit level between CRC bit and UE-ID bit. If not, 16-bit UE-ID may be scrambled by circular extension way on top of X ("X" being equal to or greater than 16) bit CRC bits.

As one example of CRC masking, an eNB can configure a common resource pools so multiple UEs can have common information bit size. Encoded bit sizes can have multiple AL (Aggregation Level), such as AL 1, 2, 4. In one aspect, a UE can select the multiple AL (Aggregation Level) based on link budget (e.g. based on downlink reference signal received power "RSRP"), PRBs if a contention based on PRB level with, e.g. PUSCH structure). In one aspect if the eNB can blind-decode the contention based SR packet.

Figure 13:
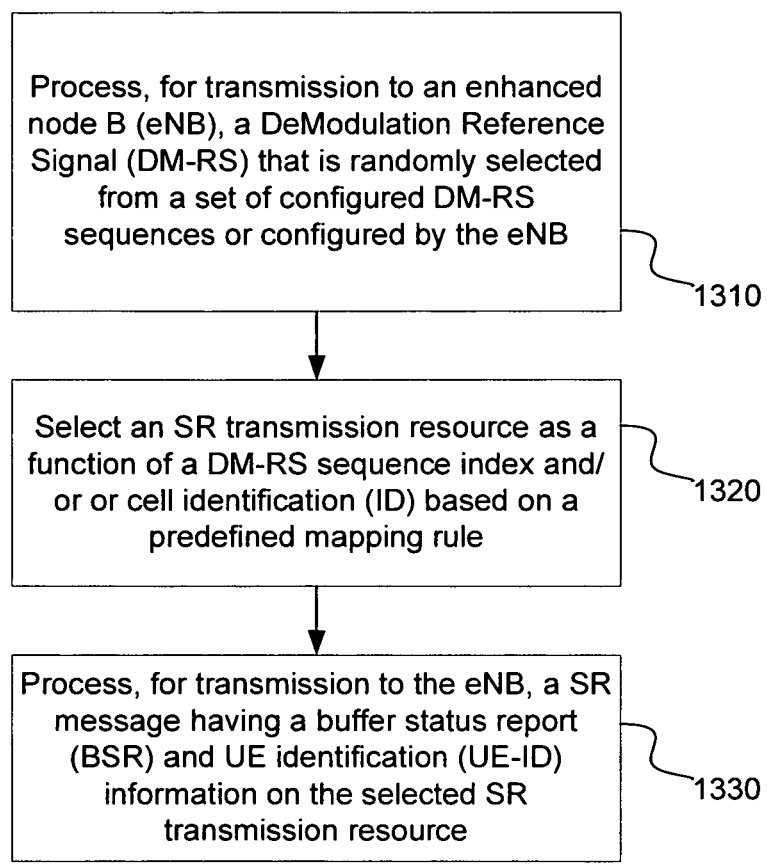
FIG. 13 depicts functionality of a user equipment (UE) operable to perform contention based scheduling request (SR) transmission with an evolved node B (eNB) in accordance with an example.

FIG. 13 depicts functionality 1300 of a user equipment (UE) operable to perform contention based scheduling request (SR) transmission with an evolved node B (eNB). The functionality 1300 can be implemented as a method or the functionality 1300 can be executed as instructions on a machine, where the instructions are included on one or more computer readable mediums or one or more non-transitory machine readable storage mediums. One or more processors and memory can be configured to process, for transmission to an enhanced node B (eNB), a DeModulation Reference Signal (DM-RS) that is randomly selected from a set of configured DM-RS sequences or configured by the eNB, as in block 1310. The one or more processors and memory can be configured to select an SR transmission resource as a function of a DM-RS sequence index and/or cell identification (ID) based on a predefined mapping rule, as in block 1320. The one or more processors and memory can be configured to process, for transmission to the eNB, a SR message having a buffer status report (BSR) and UE identification (UE-ID) information on the selected SR transmission resource, as in block 1330.

Figure 14:
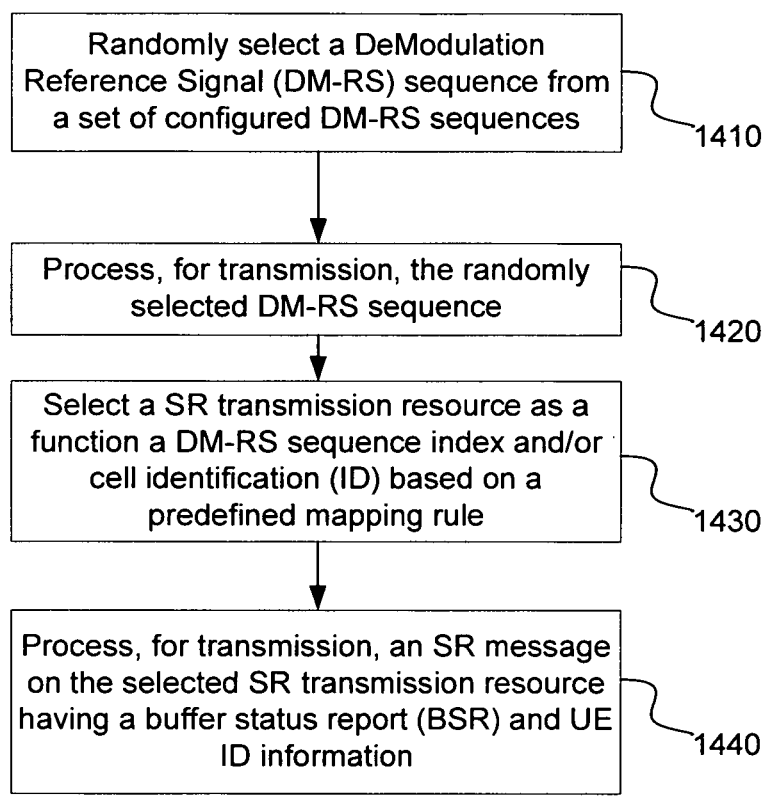
FIG. 14 depicts additional functionality of a user equipment (UE) operable to perform contention based scheduling request (SR) transmission with an evolved node B (eNB) in accordance with an example.

FIG. 14 depicts functionality 1400 of a user equipment (UE) operable to perform contention based scheduling request (SR) transmission with an evolved node B (eNB). The functionality 1400 can be implemented as a method or the functionality 1400 can be executed as instructions on a machine, where the instructions are included on one or more computer readable mediums or one or more non-transitory machine readable storage mediums. One or more processors and memory can be configured to randomly select a DeModulation Reference Signal (DM-RS) sequence from a set of configured DM-RS sequences, as in block 1410. The one or more processors and memory can be configured to process, for transmission, the randomly selected DM-RS sequence, as in block 1420. The one or more processors and memory can be configured to select a SR transmission resource as a function a DM-RS sequence index and/or cell identification (ID) based on a predefined mapping rule, as in block 1430. The one or more processors and memory can be configured to generate, for transmission, a SR message on the selected SR transmission resource having a buffer status report (BSR) and UE ID information, as in block 1440.

Figure 15:
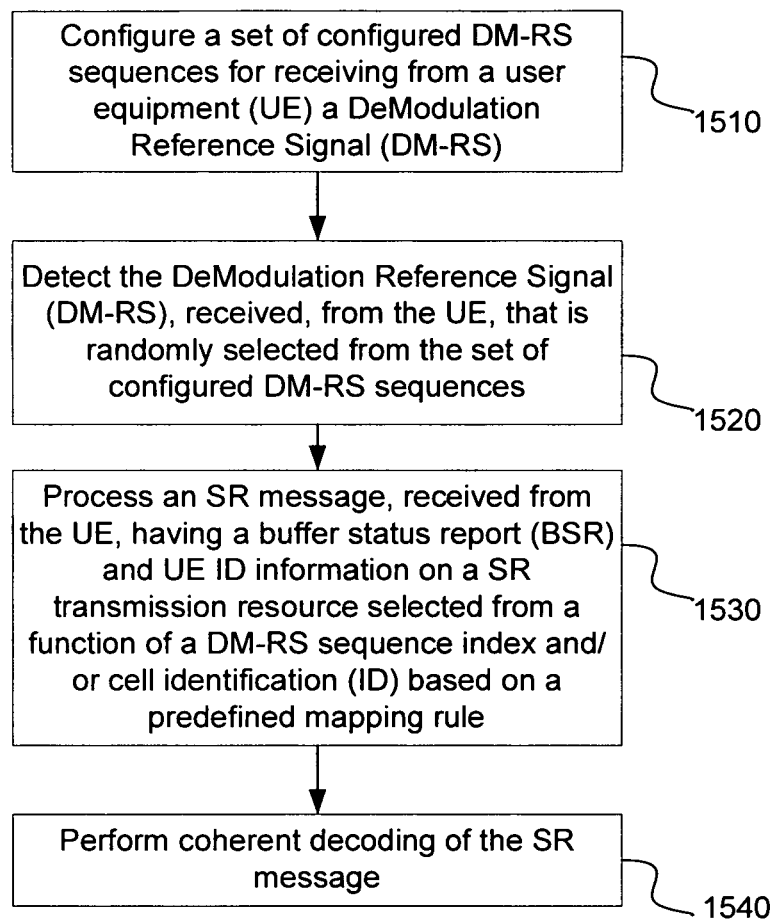
FIG. 15 depicts functionality of an evolved node B (eNB) operable to perform contention based scheduling request (SR) transmission with a user equipment (UE) in accordance with an example.

FIG. 15 depicts functionality 1500 of an evolved node B (eNB) operable to perform contention based scheduling request (SR) transmission with a user equipment (UE). The functionality 1500 can be implemented as a method or the functionality 1500 can be executed as instructions on a machine, where the instructions are included on one or more computer readable mediums or one or more non-transitory machine readable storage mediums. One or more processors and memory can be configured to configure a set of configured DM-RS sequences for receiving from the UE a DeModulation Reference Signal (DM-RS), as in block 1510. The one or more processors and memory can be configured to detect the DeModulation Reference Signal (DM-RS), received, from the UE, that is randomly selected from the set of configured DM-RS sequences, as in block 1520. The one or more processors and memory can be configured to process an SR message (received from the UE) having a buffer status report (BSR) and UE ID information on a SR transmission resource selected from a function of a DM-RS sequence index and/or cell identification (ID) based on a predefined mapping rule, as in block 1530. The one or more processors and memory can be configured to perform coherent decoding of the SR message, as in block 1540.

Figure 16:
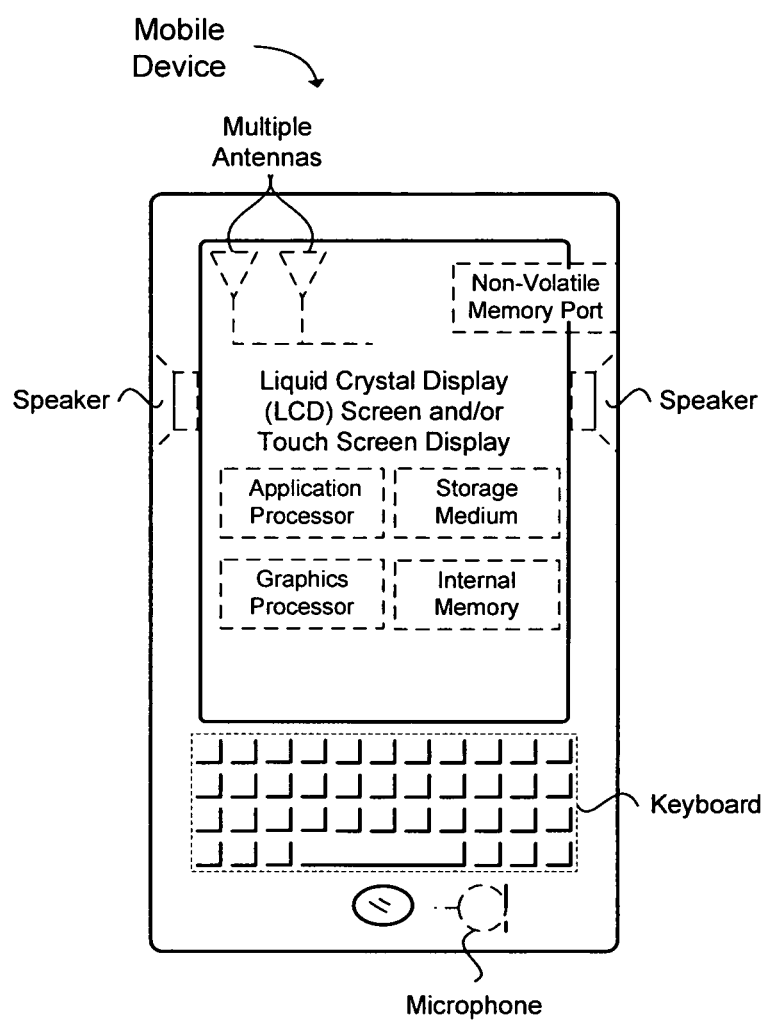
FIG. 16 illustrates a diagram of a wireless device (e.g., UE) in accordance with an example.

FIG. 16 illustrates a diagram of a wireless device (e.g., UE) in accordance with an example. FIG. 16 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

Figure 17:
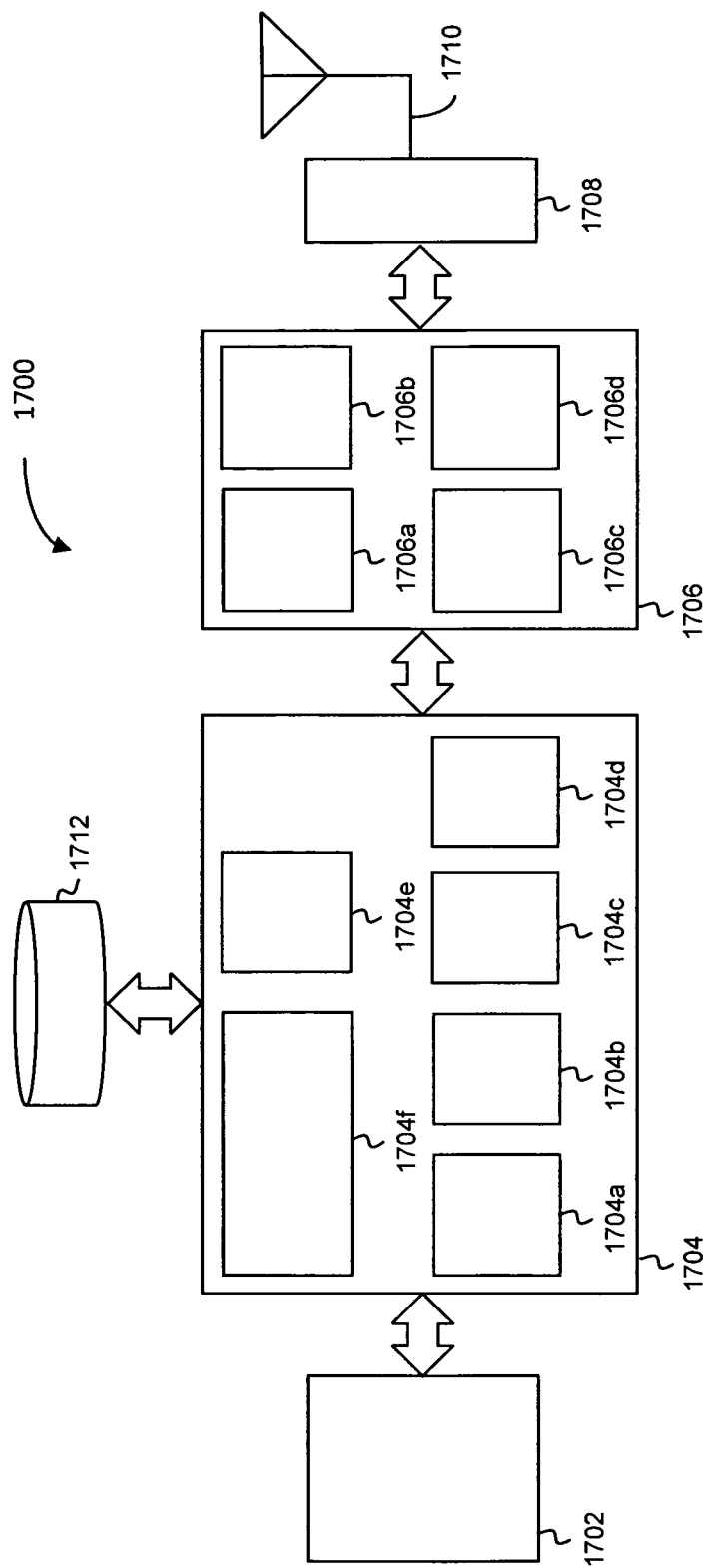
FIG. 17 illustrates a diagram of example components of a User Equipment (UE) device in accordance with an example.

FIG. 17 illustrates, for one aspect, example components of a User Equipment (UE) device 1700. In some aspects, the UE device 1700 can include application circuitry 1702, baseband circuitry 1704, Radio Frequency (RF) circuitry 1706, front-end module (FEM) circuitry 1708 and one or more antennas 1710, coupled together at least as shown.

The application circuitry 1702 can include one or more application processors. For example, the application circuitry 1702 can include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 1712, and may be configured to execute instructions stored in the storage medium 1712 to enable various applications and/or operating systems to run on the system.

The baseband circuitry 1704 can include circuitry such as, but not limited to, one or more single-core or multi-core processors. The baseband circuitry 1704 can include one or more baseband processors and/or control logic to process baseband signals received from a receive signal path of the RF circuitry 1706 and to generate baseband signals for a transmit signal path of the RF circuitry 1706. Baseband processing circuitry 1704 can interface with the application circuitry 1702 for generation and processing of the baseband signals and for controlling operations of the RF circuitry 1706. For example, in some aspects, the baseband circuitry 1704 can include a second generation (2G) baseband processor 1704a, third generation (3G) baseband processor 1704b, fourth generation (4G) baseband processor 1704c, and/or other baseband processor(s) 1704d for other existing generations, generations in development or to be developed in the future (e.g., fifth generation (5G), 6G, etc.). The baseband circuitry 1704 (e.g., one or more of baseband processors 1704a-d) can handle various radio control functions that enable communication with one or more radio networks via the RF circuitry 1706. The radio control functions can include, but are not limited to, signal modulation/demodulation, encoding/decoding, radio frequency shifting, etc. In some aspects, modulation/demodulation circuitry of the baseband circuitry 1704 can include Fast-Fourier Transform (FFT), precoding, and/or constellation mapping/demapping functionality. In some aspects, encoding/decoding circuitry of the baseband circuitry 1704 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1704 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1704e of the baseband circuitry 1704 can be configured to run elements of the protocol stack for signaling of the PHY, MAC, RLC, PDCP and/or RRC layers. In some aspects, the baseband circuitry can include one or more audio digital signal processor(s) (DSP) 1704f. The audio DSP(s) 1704f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1704 and the application circuitry 1702 can be implemented together such as, for example, on a system on a chip (SOC).

In some aspects, the baseband circuitry 1704 can provide for communication compatible with one or more radio technologies. For example, in some aspects, the baseband circuitry 1704 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1704 is configured to support radio communications of more than one wireless protocol can be referred to as multi-mode baseband circuitry.

RF circuitry 1706 can enable communication with wireless networks using modulated electromagnetic radiation through a non-solid medium. In various aspects, the RF circuitry 1706 can include switches, filters, amplifiers, etc. to facilitate the communication with the wireless network. RF circuitry 1706 can include a receive signal path which can include circuitry to down-convert RF signals received from the FEM circuitry 1708 and provide baseband signals to the baseband circuitry 1704. RF circuitry 1706 can also include a transmit signal path which can include circuitry to up-convert baseband signals provided by the baseband circuitry 1704 and provide RF output signals to the FEM circuitry 1708 for transmission.

In some aspects, the RF circuitry 1706 can include a receive signal path and a transmit signal path. The receive signal path of the RF circuitry 1706 can include mixer circuitry 1706a, amplifier circuitry 1706b and filter circuitry 1706c. The transmit signal path of the RF circuitry 1706 can include filter circuitry 1706c and mixer circuitry 1706a. RF circuitry 1706 can also include synthesizer circuitry 1706d for synthesizing a frequency for use by the mixer circuitry 1706a of the receive signal path and the transmit signal path. In some aspects, the mixer circuitry 1706a of the receive signal path can be configured to down-convert RF signals received from the FEM circuitry 1708 based on the synthesized frequency provided by synthesizer circuitry 1706d. The amplifier circuitry 1706b can be configured to amplify the down-converted signals and the filter circuitry 1706c can be a low-pass filter (LPF) or band-pass filter (BPF) configured to remove unwanted signals from the down-converted signals to generate output baseband signals. Output baseband signals can be provided to the baseband circuitry 1704 for further processing. In some aspects, the output baseband signals can be zero-frequency baseband signals, although this is not a mandate. In some aspects, mixer circuitry 1706a of the receive signal path can comprise passive mixers, although the scope of the aspects is not limited in this respect.

In some aspects, the mixer circuitry 1706a of the transmit signal path can be configured to up-convert input baseband signals based on the synthesized frequency provided by the synthesizer circuitry 1706d to generate RF output signals for the FEM circuitry 1708. The baseband signals can be provided by the baseband circuitry 1704 and can be filtered by filter circuitry 1706c. The filter circuitry 1706c can include a low-pass filter (LPF), although the scope of the aspects is not limited in this respect.

In some aspects, the mixer circuitry 1706a of the receive signal path and the mixer circuitry 1706a of the transmit signal path can include two or more mixers and can be arranged for quadrature downconversion and/or upconversion respectively. In some aspects, the mixer circuitry 1706a of the receive signal path and the mixer circuitry 1706a of the transmit signal path can include two or more mixers and can be arranged for image rejection (e.g., Hartley image rejection). In some aspects, the mixer circuitry 1706a of the receive signal path and the mixer circuitry 1706a can be arranged for direct downconversion and/or direct upconversion, respectively. In some aspects, the mixer circuitry 1706a of the receive signal path and the mixer circuitry 1706a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1706 can include analog-to-digital converter (ADC) and digital-to-analog converter (DAC) circuitry and the baseband circuitry 1704 can include a digital baseband interface to communicate with the RF circuitry 1706.

In some dual-mode embodiments, a separate radio IC circuitry can be provided for processing signals for each spectrum, although the scope of the embodiments is not limited in this respect.

In some embodiments, the synthesizer circuitry 1706d can be a fractional-N synthesizer or a fractional N/N+1 synthesizer, although the scope of the embodiments is not limited in this respect as other types of frequency synthesizers can be suitable. For example, synthesizer circuitry 1706d can be a delta-sigma synthesizer, a frequency multiplier, or a synthesizer comprising a phase-locked loop with a frequency divider.

The synthesizer circuitry 1706d can be configured to synthesize an output frequency for use by the mixer circuitry 1706a of the RF circuitry 1706 based on a frequency input and a divider control input. In some embodiments, the synthesizer circuitry 1706d can be a fractional N/N+1 synthesizer.

In some embodiments, frequency input can be provided by a voltage controlled oscillator (VCO), although that is not a mandate. Divider control input can be provided by either the baseband circuitry 1704 or the applications processor 1702 depending on the desired output frequency. In some embodiments, a divider control input (e.g., N) can be determined from a look-up table based on a channel indicated by the applications processor 1702.

Synthesizer circuitry 1706d of the RF circuitry 1706 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1706 can include an IQ/polar converter.

FEM circuitry 1708 can include a receive signal path which can include circuitry configured to operate on RF signals received from one or more antennas 1710, amplify the received signals and provide the amplified versions of the received signals to the RF circuitry 1706 for further processing. FEM circuitry 1708 can also include a transmit signal path which can include circuitry configured to amplify signals for transmission provided by the RF circuitry 1706 for transmission by one or more of the one or more antennas 1710.

In some embodiments, the FEM circuitry 1708 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1706). The transmit signal path of the FEM circuitry 1708 can include a power amplifier (PA) to amplify input RF signals (e.g., provided by RF circuitry 1706), and one or more filters to generate RF signals for subsequent transmission (e.g., by one or more of the one or more antennas 1710.

In some embodiments, the UE device 1800 can include additional elements such as, for example, memory/storage, display, camera, sensor, and/or input/output (I/O) interface.

Figure 18:
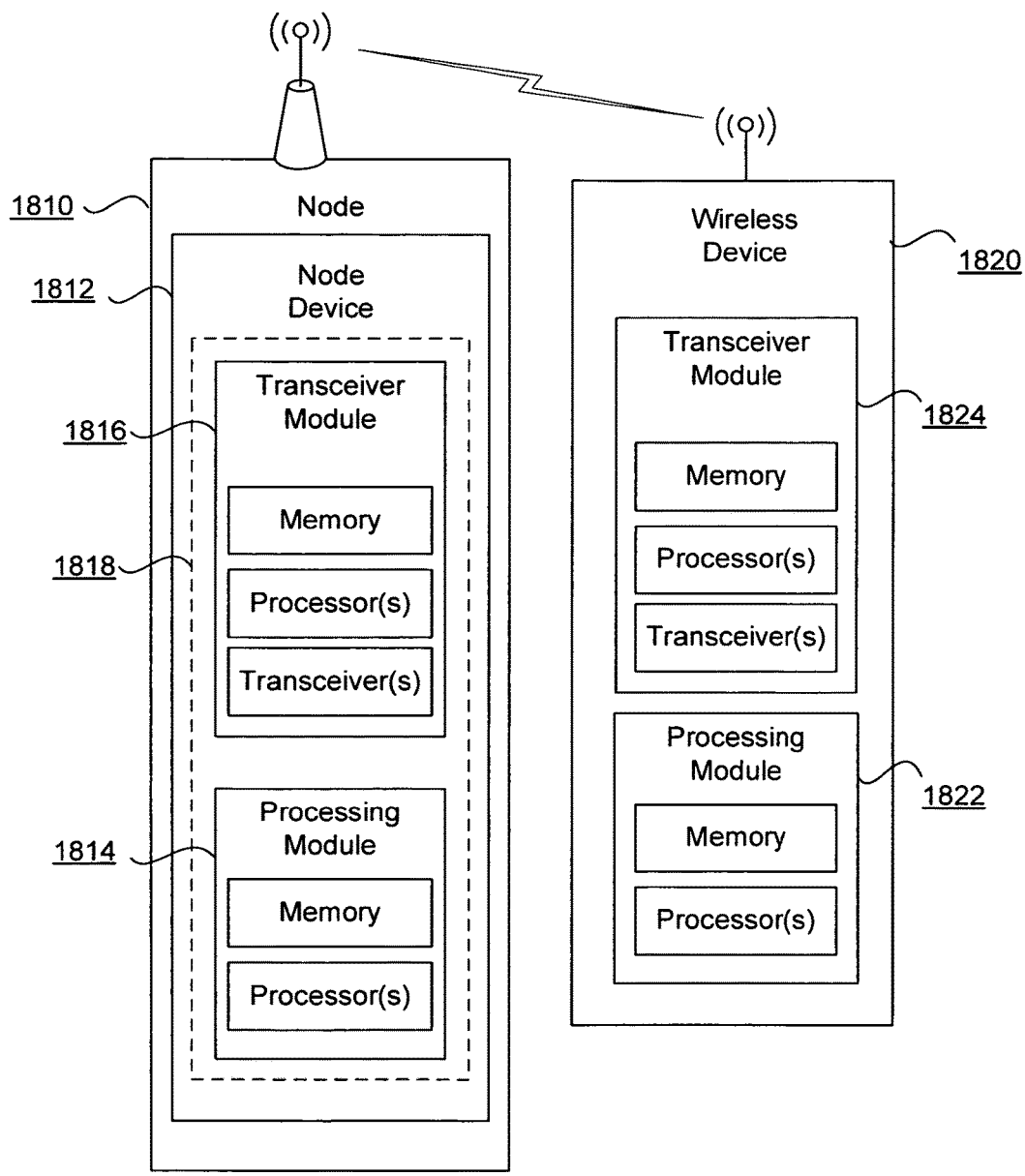
FIG. 18 illustrates a diagram of a node (e.g., eNB) and wireless device (e.g., UE) in accordance with an example.

FIG. 18 illustrates a diagram 1800 of a node 1810 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1810 can include a node device 1812. The node device 1812 or the node 1810 can be configured to communicate with the wireless device 1820. The node device 1812 can be configured to implement the technology described. The node device 1812 can include a processing module 1814 and a transceiver module 1816. In one aspect, the node device 1812 can include the transceiver module 1816 and the processing module 1814 forming a circuitry 1818 for the node 1810. In one aspect, the transceiver module 1816 and the processing module 1814 can form a circuitry of the node device 1812. The processing module 1814 can include one or more processors and memory. In one embodiment, the processing module 1822 can include one or more application processors. The transceiver module 1816 can include a transceiver and one or more processors and memory. In one embodiment, the transceiver module 1816 can include a baseband processor.

The wireless device 1820 can include a transceiver module 1824 and a processing module 1822. The processing module 1822 can include one or more processors and memory. In one embodiment, the processing module 1822 can include one or more application processors. The transceiver module 1824 can include a transceiver and one or more processors and memory. In one embodiment, the transceiver module 1824 can include a baseband processor. The wireless device 1820 can be configured to implement the technology described. The node 1810 and the wireless devices 1820 can also include one or more storage mediums, such as the transceiver module 1816, 1824 and/or the processing module 1814, 1822.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

EXAMPLES

The following examples pertain to specific invention embodiments and point out specific features, elements, or steps that can be used or otherwise combined in achieving such embodiments.

Example 1 includes an apparatus of a user equipment (UE), the UE configured for contention based scheduling request (SR) transmission, the apparatus comprising one or more processors and memory configured to: process, for transmission to an enhanced node B (eNB), a DeModulation Reference Signal (DM-RS) that is randomly selected from a set of configured DM-RS sequences or configured by the eNB; select an SR transmission resource as a function of a DM-RS sequence index or cell identification (ID) based on a predefined mapping rule; and process, for transmission to the eNB, a SR message having a buffer status report (BSR) and UE identification (UE-ID) information on the selected SR transmission resource.

Example 2 includes the apparatus of example 1, wherein the one or more processors and memory are further configured to configure a contention based SR transmission region; wherein the contention based SR transmission region can be configured by higher layers in a cell specific manner via a master information block (MIB), a system information block (SIB), or a UE-specific dedicated radio resource control layer (RRC) signalling, wherein the contention based SR transmission region is located adjacent to a physical uplink control channel (PUCCH) region.

Example 3 includes the apparatus of example 1 or 2, wherein the one or more processors and memory are further configured to use inter-slot hopping for transmitting the SR message.

Example 4 includes the apparatus of example 1, wherein the one or more processors and memory are further configured to define instances of the SR messages as uplink subframes that satisfy $(10 \times n_f + \lfloor n_s/2 \rfloor - N_{OFFSET,CB\_SR}) \mod CB\_SR_{PERIODICITY} = 0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity.

Example 5 includes the apparatus of example 1 or 4, wherein the one or a processors and memory are further configured to reuse a resource mapping for a physical uplink control channel (PUCCH) format 1, 1a, 1b, 2, 2a, 2b, or 3, as defined by 3rd generation partnership project (3GPP) long term evolution (LTE) Release 12, for resource mapping the DM-RS for transmitting the SR message.

Example 6 includes the apparatus of 1, wherein the DM-RS occupies an orthogonal frequency-division multiplexing (OFDM) symbol #0, #1, #2, #5 and #6 for a normal cyclic prefix (CP) for each slot.

Example 7 includes the apparatus of example 1, wherein the DM-RS occupies an orthogonal frequency-division multiplexing (OFDM) symbol #0, #2, #4, and #6 for a normal cyclic prefix (CP) for each slot.

Example 8 includes the apparatus of example 1, wherein the one or more processors and memory are further configured to generate a DM-RS sequence by randomly selecting a cyclic shift (CS), an orthogonal cover code (OCC) index, or a combination of the CS and the OCC index, wherein a subset of the DMRS sequence is configured by the eNB using a master information block (MIB), a system information block (SIB), or a UE-specific dedicated radio resource control layer (RRC) signalling.

Example 9 includes the apparatus of example 1 or 6, wherein the one or more processors and memory are further configured to configure the DM-RS sequence index and a cyclic shift (CS), an orthogonal cover code (OCC) index, or a combination of the CS and the OCC index in a UE specific manner using a UE-specific dedicated radio resource control layer (RRC) signalling.

Example 10 includes the apparatus of example 1, wherein the one or more processors and memory are further configured to include in the SR message a DM-RS sequence and/or transmit a DM-RS sequence which carries specified information in the SR message.

Example 11 includes the apparatus of example 1 or 10, wherein the one or more processors and memory are further configured to divide the DM-RS sequence index into a first group indicating a short SR message transmission and second group indicates a long SR message transmission.

Example 12 includes the apparatus of example 1, wherein the one or more processors and memory are further configured to process, for transmission, the SR message according to a localized SR message transmission or a distributed SR message transmission, wherein the localized SR message transmission and the distributed SR message are predefined via a master information block (MIB), a system information block (SIB), or a UE-specific dedicated radio resource control layer (RRC) signalling.

Example 13 includes the apparatus of example 1 or 12, wherein the one or more processors and memory are further configured to reuse a physical uplink control channel (PUCCH) format 1a, 1b, 2, 2a, 2b, or 3, as defined by 3rd generation partnership project (3GPP) long term evolution (LTE) Release 12, for transmitting the SR message.

Example 14 includes the apparatus of example 1, wherein the one or more processors and memory are further configured to randomly select the SR transmission resource for transmitting the SR message.

Example 15 includes the apparatus of example 1, wherein the one or more processors and memory are further configured to select the SR transmission resource for transmitting the SR message based on the UE-ID.

Example 16 includes the apparatus of example 1 or 16, wherein the one or more processors and memory are further configured to scramble the UE-ID on at least one or more bits of a cyclic redundancy check (CRC).

Example 17 includes the apparatus of example 1, wherein the apparatus includes at least one of an antenna, a touch sensitive display screen, a speaker, a microphone, a graphics processor, an application processor, internal memory, a non-volatile memory port, and combinations thereof.

Example 18 includes at least one machine readable storage medium having instructions embodied thereon for contention based scheduling request (SR) transmission of a user equipment (UE), the instructions when executed perform the following: randomly select a DeModulation Reference Signal (DM-RS) sequence from a set of configured DM-RS sequences; process, for transmission, the randomly selected DM-RS sequence; select a SR transmission resource as a function a DM-RS sequence index and/or cell identification (ID) based on a predefined mapping rule; and generate, for transmission, a SR message on the selected SR transmission resource having a buffer status report (BSR) and UE ID information.

Example 19 includes the at least one machine readable storage medium of example 18, further comprising instructions which when executed performs the following: configure a contention based SR transmission region for transmitting the SR message.

Example 20 includes the at least one machine readable storage medium of example 18 or 19, further comprising instructions which when executed performs the following: include in the SR message a DM-RS sequence generated according to a bit sequence generated as a function of the SR message using $a=f(b_{SR})$, where a is the generated bit sequence and $b_{SR}$ is the bit sequence for the SR message, wherein a "Y" bit is selected from a to generate the DM-RS sequence according to the Y bit.

Example 21 includes the at least one machine readable storage medium of example 18, further comprising instructions which when executed performs the following: select the SR transmission resource as a function of the DM-RS sequence index, the cell identification (ID) based on the predefined mapping rule, a physical resource block (PRB) index, or a subframe index used for transmitting the SR message based on the predefined mapping rule.

Example 22 includes the at least one machine readable storage medium of example 18 or 21, wherein predefined mapping rule is a function of the DM-RS sequence index and a cell identification (ID) as $I_{SR}=f(n_{CS},n_{oc},n_{cell}^{ID})$, where $n_{cell}^{ID}$ is a physical cell ID, and $I_{SR}=(c_0 \cdot n_{CS}+c_1 \cdot n_{oc}+c_2 \cdot n_{cell}^{ID}+c_3) \bmod(N)$, where $c_0$, $c_1$, $c_2$ and $c_3$ are predefined constants predefined or configured by higher layers via master information block (MIB), a system information block (SIB), or a UE-specific dedicated radio resource control layer (RRC) signalling.

Example 23 includes the at least one machine readable storage medium of example 18 or 21, wherein predefined mapping rule is a function of the DM-RS sequence index as $I_{SR}=f(I_{DMRS})$, where $I_{SR}$ is a SR transmission resource index, and $I_{SR}=0,1,N-1$, where N is a total number of SR transmission resources in a physical resource block (PRB) pair, and $I_{DMRS}$ is the DM-RS sequence index.

Example 24 includes the at least one machine readable storage medium of example 18, further comprising instructions which when executed performs the following: define instances of the SR messages as uplink subframes that satisfy $(10 \times n_f + \lfloor n_s/2 \rfloor - N_{OFFSET,CB\_SR}) \bmod CB\_SR_{PERIODICITY}=0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity.

Example 25 includes the at least one machine readable storage medium of example 18, further comprising instructions which when executed performs the following: reuse a resource mapping for a physical uplink control channel (PUCCH) format 1, 1a, 1 b, 2, 2a, 2b, or 3 for resource mapping the DM-RS for transmitting the SR message.

Example 26 includes the at least one machine readable storage medium of example 18 or 25, wherein the DM-RS occupies an orthogonal frequency-division multiplexing (OFDM) symbol #0, #1, #2, #5 and #6 or OFDM symbol #0, #2, #4, and #6 for a normal cyclic prefix (CP) for each slot.

Example 27 includes the at least one machine readable storage medium of example 18, further comprising instructions which when executed performs the following: generate a DM-RS sequence by randomly selecting a cyclic shift (CS), an orthogonal cover code (OCC) index, or a combination of the CS and the OCC index.

Example 28 includes the at least one machine readable storage medium of example 18, further comprising instructions which when executed performs the following: configure the DM-RS sequence index and a cyclic shift (CS), an orthogonal cover code (OCC) index, or a combination of the CS and the OCC index using a UE-specific dedicated radio resource control layer (RRC) signalling.

Example 29 includes the at least one machine readable storage medium of example 18, further comprising instructions which when executed performs the following: include in the SR message a DM-RS sequence and/or transmit a DM-RS sequence which carries specified information in the SR message.

Example 30 includes the at least one machine readable storage medium of example 18 or 29, further comprising instructions which when executed performs the following:

divide the DM-RS sequence index into a first group indicating a short SR message transmission and second group indicates a long SR message transmission.

Example 31 includes the at least one machine readable storage medium of example 18, further comprising instructions which when executed performs the following: process, for transmission, the SR message according to a localized SR message transmission or a distributed SR message transmission.

Example 32 includes the at least one machine readable storage medium of example 18 or 31, further comprising instructions which when executed performs the following: reuse a physical uplink control channel (PUCCH) format 1a, 1b, 2, 2a, 2b, or 3, as defined by, 3rd generation partnership project (3GPP) long term evolution (LTE) Release 12, for transmitting the SR message.

Example 33 includes the at least one machine readable storage medium of example 18, further comprising instructions which when executed performs the following: select the SR transmission resource for transmitting the SR message based on the UE-ID, wherein the UE-ID is a cell radio network temporary identifier (C-RNTI).

Example 34 includes the at least one machine readable storage medium of example 18 or 33, wherein the one or more processors and memory are further configured to scramble the UE-ID on at least one or more bits of a cyclic redundancy check (CRC).

Example 35 includes an apparatus of an eNodeB operable for contention based scheduling request (SR) transmission with a user equipment (UE), the apparatus comprising one or more processors and memory configured to: configure a set of configured DM-RS sequences for receiving from the UE a DeModulation Reference Signal (DM-RS); detect the DeModulation Reference Signal (DM-RS), received, from the UE, that is randomly selected from the set of configured DM-RS sequences; process an SR message, received from the UE, having a buffer status report (BSR) and UE ID information on a SR transmission resource selected from a function of a DM-RS sequence index and/or cell identification (ID) based on a predefined mapping rule; and perform coherent decoding of the SR message.

Example 36 includes an apparatus of a user equipment (UE), the UE configured for contention based scheduling request (SR) transmission, the apparatus comprising one or more processors and memory configured to: process, for transmission to an enhanced node B (eNB), a DeModulation Reference Signal (DM-RS) that is randomly selected from a set of configured DM-RS sequences or configured by the eNB; select an SR transmission resource as a function of a DM-RS sequence index or cell identification (ID) based on a predefined mapping rule; and process, for transmission to the eNB, a SR message having a buffer status report (BSR) and UE identification (UE-ID) information on the selected SR transmission resource.

Example 37 includes the apparatus of example 36, wherein the one or more processors and memory are further configured to configure a contention based SR transmission region; wherein the contention based SR transmission region can be configured by higher layers in a cell specific manner via a master information block (MIB), a system information block (SIB), or a UE-specific dedicated radio resource control layer (RRC) signalling, wherein the contention based SR transmission region is located adjacent to a physical uplink control channel (PUCCH) region.

Example 38 includes the apparatus of example 36, wherein the one or more processors and memory are further configured to use inter-slot hopping for transmitting the SR message.

Example 39 includes the apparatus of example 36, wherein the one or more processors and memory are further configured to define instances of the SR messages as uplink subframes that satisfy $(10 \times n_f + \lfloor n_s/2 \rfloor - N_{OFFSET,CB\_SR}) \bmod CB\_SR_{PERIODICITY} = 0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity.

Example 40 includes the apparatus of example 36, wherein the one or a processors and memory are further configured to reuse a resource mapping for a physical uplink control channel (PUCCH) format 1, 1a, 1b, 2, 2a, 2b, or 3, as defined by 3rd generation partnership project (3GPP) long term evolution (LTE) Release 12, for resource mapping the DM-RS for transmitting the SR message.

Example 41 includes the apparatus of example 36, wherein the DM-RS occupies an orthogonal frequency-division multiplexing (OFDM) symbol #0, #1, #2, #5 and #6 for a normal cyclic prefix (CP) for each slot.

Example 42 includes the apparatus of example 36, wherein the DM-RS occupies an orthogonal frequency-division multiplexing (OFDM) symbol #0, #2, #4, and #6 for a normal cyclic prefix (CP) for each slot.

Example 43 includes the apparatus of example 36, wherein the one or more processors and memory are further configured to generate a DM-RS sequence by randomly selecting a cyclic shift (CS), an orthogonal cover code (OCC) index, or a combination of the CS and the OCC index, wherein a subset of the DMRS sequence is configured by the eNB using a master information block (MIB), a system information block (SIB), or a UE-specific dedicated radio resource control layer (RRC) signalling.

Example 44 includes the apparatus of example 36, wherein the one or more processors and memory are further configured to configure the DM-RS sequence index and a cyclic shift (CS), an orthogonal cover code (OCC) index, or a combination of the CS and the OCC index in a UE specific manner using a UE-specific dedicated radio resource control layer (RRC) signalling.

Example 45 includes the apparatus of example 36, wherein the one or more processors and memory are further configured to include in the SR message a DM-RS sequence or transmit the DM-RS sequence which carries specified information in the SR message.

Example 46 includes the apparatus of example 36, wherein the one or more processors and memory are further configured to divide the DM-RS sequence index into a first group indicating a short SR message transmission and second group indicates a long SR message transmission.

Example 47 includes the apparatus of example 36, wherein the one or more processors and memory are further configured to process, for transmission, the SR message according to a localized SR message transmission or a distributed SR message transmission, wherein the localized SR message transmission and the distributed SR message are predefined via a master information block (MIB), a system information block (SIB), or a UE-specific dedicated radio resource control layer (RRC) signalling.

Example 48 includes the apparatus of example 36, wherein the one or more processors and memory are further configured to reuse a physical uplink control channel (PUCCH) format 1a, 1b, 2, 2a, 2b, or 3, as defined by 3rd generation partnership project (3GPP) long term evolution (LTE) Release 12, for transmitting the SR message.

Example 49 includes the apparatus of example 36, wherein the one or more processors and memory are further configured to randomly select the SR transmission resource for transmitting the SR message.

Example 50 includes the apparatus of example 36, wherein the one or more processors and memory are further configured to select the SR transmission resource for transmitting the SR message based on the UE-ID.

Example 51 includes the apparatus of example 36, wherein the one or more processors and memory are further configured to scramble the UE-ID on at least one or more bits of a cyclic redundancy check (CRC).

Example 52 includes the apparatus of example 36, wherein the apparatus includes at least one of an antenna, a touch sensitive display screen, a speaker, a microphone, a graphics processor, an application processor, internal memory, a non-volatile memory port, and combinations thereof.

Example 53 one or more transitory or non-transitory machine readable storage mediums having instructions embodied thereon for contention based scheduling request (SR) transmission of a user equipment (UE), the instructions when executed perform the following: randomly select a DeModulation Reference Signal (DM-RS) sequence from a set of configured DM-RS sequences; process, for transmission, the randomly selected DM-RS sequence; select a SR transmission resource as a function a DM-RS sequence index and/or cell identification (ID) based on a predefined mapping rule; and generate, for transmission, a SR message on the selected SR transmission resource having a buffer status report (BSR) and UE ID information.

Example 54 the one or more transitory or non-transitory machine readable storage mediums of example 53, further comprising instructions which when executed performs the following: configure a contention based SR transmission region for transmitting the SR message.

Example 55 the one or more transitory or non-transitory machine readable storage mediums of example 53, further comprising instructions which when executed performs the following: include in the SR message a DM-RS sequence generated according to a bit sequence generated as a function of the SR message using $a=f(b_{SR})$, where a is the generated bit sequence and $b_{SR}$ is the bit sequence for the SR message, wherein a "Y" bit is selected from a to generate the DM-RS sequence according to the Y bit.

Example 56 the one or more transitory or non-transitory machine readable storage mediums of example 53, further comprising instructions which when executed performs the following: select the SR transmission resource as a function of the DM-RS sequence index, the cell identification (ID) based on the predefined mapping rule, a physical resource block (PRB) index, or a subframe index used for transmitting the SR message based on the predefined mapping rule.

Example 57 the one or more transitory or non-transitory machine readable storage mediums of example 53, wherein predefined mapping rule is a function of the DM-RS sequence index and a cell identification (ID) as $I_{SR}=f(n_{CS}, n_{oc}, n_{cell}^{ID})$ where $n_{cell}^{ID}$ is a physical cell ID, and $I_{SR}=(c_0 \cdot n_{CS}+c_1 \cdot n_{oc}+c_2 \cdot n_{cell}^{ID}+c_3) \mod(N)$, where $c_0$, $c_1$, $c_2$ and $c_3$ are predefined constants predefined or configured by higher layers via master information block (MIB), a system information block (SIB), or a UE-specific dedicated radio resource control layer (RRC) signalling.

Example 58 the one or more transitory or non-transitory machine readable storage mediums of example 53, wherein predefined mapping rule is a function of the DM-RS sequence index as $I_{SR}=f(I_{DMRS})$, where $I_{SR}$ is a SR transmission resource index, and $I_{SR}=0,1,N-1$, where N is a total number of SR transmission resources in a physical resource block (PRB) pair, and $I_{DMRS}$ is the DM-RS sequence index.

Example 59 the one or more transitory or non-transitory machine readable storage mediums of example 53, further comprising instructions which when executed performs the following: define instances of the SR messages as uplink subframes that satisfy $(10 \times n_f + \lfloor n_s/2 \rfloor - N_{OFFSET,CB\_SR}) \mod CB\_SR_{PERIODICITY}=0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity.

Example 60 the one or more transitory or non-transitory machine readable storage mediums of example 53, further comprising instructions which when executed performs the following: reuse a resource mapping for a physical uplink control channel (PUCCH) format 1, 1a, 1b, 2, 2a, 2b, or 3 for resource mapping the DM-RS for transmitting the SR message.

Example 61 the one or more transitory or non-transitory machine readable storage mediums of example 53, wherein the DM-RS occupies an orthogonal frequency-division multiplexing (OFDM) symbol #0, #1, #2, #5 and #6 or OFDM symbol #0, #2, #4, and #6 for a normal cyclic prefix (CP) for each slot.

Example 62 the one or more transitory or non-transitory machine readable storage mediums of example 53, further comprising instructions which when executed performs the following: generate a DM-RS sequence by randomly selecting a cyclic shift (CS), an orthogonal cover code (OCC) index, or a combination of the CS and the OCC index.

Example 63 the one or more transitory or non-transitory machine readable storage mediums of example 53, further comprising instructions which when executed performs the following: configure the DM-RS sequence index and a cyclic shift (CS), an orthogonal cover code (OCC) index, or a combination of the CS and the OCC index using a UE-specific dedicated radio resource control layer (RRC) signalling.

Example 64 the one or more transitory or non-transitory machine readable storage mediums of example 53, further comprising instructions which when executed performs the following: include in the SR message a DM-RS sequence or transmit the DM-RS sequence which carries specified information in the SR message.

Example 65 the one or more transitory or non-transitory machine readable storage mediums of example 53, further comprising instructions which when executed performs the following: divide the DM-RS sequence index into a first group indicating a short SR message transmission and second group indicates a long SR message transmission.

Example 66 the one or more transitory or non-transitory machine readable storage mediums of example 53, further comprising instructions which when executed performs the following: process, for transmission, the SR message according to a localized SR message transmission or a distributed SR message transmission.

Example 67 the one or more transitory or non-transitory machine readable storage mediums of example 53, further comprising instructions which when executed performs the following: reuse a physical uplink control channel (PUCCH) format 1a, 1b, 2, 2a, 2b, or 3, as defined by, 3rd generation partnership project (3GPP) long term evolution (LTE) Release 12, for transmitting the SR message.

Example 68 the one or more transitory or non-transitory machine readable storage mediums of example 53, further comprising instructions which when executed performs the following: select the SR transmission resource for transmitting the SR message based on the UE-ID, wherein the UE-ID is a cell radio network temporary identifier (C-RNTI).

Example 69 the one or more transitory or non-transitory machine readable storage mediums of example 53, wherein the one or more processors and memory are further configured to scramble the UE-ID on at least one or more bits of a cyclic redundancy check (CRC).

Example 70 includes an apparatus of an eNodeB operable for contention based scheduling request (SR) transmission with a user equipment (UE), the apparatus comprising one or more processors and memory configured to: configure a set of configured DM-RS sequences for receiving from the UE a DeModulation Reference Signal (DM-RS); detect the DeModulation Reference Signal (DM-RS), received, from the UE, that is randomly selected from the set of configured DM-RS sequences; process an SR message, received from the UE, having a buffer status report (BSR) and UE ID information on a SR transmission resource selected from a function of a DM-RS sequence index and/or cell identification (ID) based on a predefined mapping rule; and perform coherent decoding of the SR message.

Example 71 includes an apparatus of a user equipment (UE), the UE configured for contention based scheduling request (SR) transmission, the apparatus comprising one or more processors and memory configured to: process, for transmission to an enhanced node B (eNB), a DeModulation Reference Signal (DM-RS) that is randomly selected from a set of configured DM-RS sequences or configured by the eNB; select an SR transmission resource as a function of a DM-RS sequence index or cell identification (ID) based on a predefined mapping rule; and process, for transmission to the eNB, a SR message having a buffer status report (BSR) and UE identification (UE-ID) information on the selected SR transmission resource.

Example 72 includes the apparatus of example 71, wherein the one or more processors and memory are further configured to: configure a contention based SR transmission region; wherein the contention based SR transmission region can be configured by higher layers in a cell specific manner via a master information block (MIB), a system information block (SIB), or a UE-specific dedicated radio resource control layer (RRC) signalling, wherein the contention based SR transmission region is located adjacent to a physical uplink control channel (PUCCH) region; use inter-slot hopping for transmitting the SR message; define instances of the SR messages as uplink subframes that satisfy $(10 \times n_f + \lfloor n_s/2 \rfloor - N_{OFFSET,CB\_SR}) \mod CB\_SR_{PERIODICITY} = 0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity; or reuse a resource mapping for a physical uplink control channel (PUCCH) format 1, 1a, 1b, 2, 2a, 2b, or 3, as defined by 3rd generation partnership project (3GPP) long term evolution (LTE) Release 12, for resource mapping the DM-RS for transmitting the SR message.

Example 73 includes the apparatus of example 71 or 72, wherein the DM-RS occupies an orthogonal frequency-division multiplexing (OFDM) symbol #0, #1, #2, #5 and #6 for a normal cyclic prefix (CP) for each slot, or the DM-RS occupies an orthogonal frequency-division multiplexing (OFDM) symbol #0, #2, #4, and #6 for a normal cyclic prefix (CP) for each slot.

In Example 74, the subject matter of Example 71 or any of the Examples described herein may further include, wherein the one or more processors and memory are further configured to: generate a DM-RS sequence by randomly selecting a cyclic shift (CS), an orthogonal cover code (OCC) index, or a combination of the CS and the OCC index, wherein a subset of the DMRS sequence is configured by the eNB using a master information block (MIB), a system information block (SIB), or a UE-specific dedicated radio resource control layer (RRC) signalling; configure the DM-RS sequence index and a cyclic shift (CS), an orthogonal cover code (OCC) index, or a combination of the CS and the OCC index in a UE specific manner using a UE-specific dedicated radio resource control layer (RRC) signalling; or include in the SR message a DM-RS sequence.

In Example 75, the subject matter of Example 71 or any of the Examples described herein may further include, wherein the one or more processors and memory are further configured to: divide the DM-RS sequence index into a first group indicating a short SR message transmission and second group indicates a long SR message transmission; process, for transmission, the SR message according to a localized SR message transmission or a distributed SR message transmission, wherein the localized SR message transmission and the distributed SR message are predefined via a master information block (MIB), a system information block (SIB), or a UE-specific dedicated radio resource control layer (RRC) signalling; reuse a physical uplink control channel (PUCCH) format 1a, 1b, 2, 2a, 2b, or 3, as defined by 3rd generation partnership project (3GPP) long term evolution (LTE) Release 12, for transmitting the SR message; randomly select the SR transmission resource for transmitting the SR message; or select the SR transmission resource for transmitting the SR message based on the UE-ID.

In Example 76, the subject matter of Example 71 or any of the Examples described herein may further include, wherein the one or more processors and memory are further configured to scramble the UE-ID on at least one or more bits of a cyclic redundancy check (CRC).

In Example 77, the subject matter of Example 71 or any of the Examples described herein may further include, wherein the apparatus includes at least one of an antenna, a touch sensitive display screen, a speaker, a microphone, a graphics processor, an application processor, internal memory, a non-volatile memory port, and combinations thereof.

Example 78 includes one or more transitory or non-transitory machine readable storage mediums having instructions embodied thereon for contention based scheduling request (SR) transmission of a user equipment (UE), the instructions when executed perform the following: randomly select a DeModulation Reference Signal (DM-RS) sequence from a set of configured DM-RS sequences; process, for transmission, the randomly selected DM-RS sequence; select a SR transmission resource as a function a DM-RS sequence index and/or cell identification (ID) based on a predefined mapping rule; and generate, for transmission, a SR message on the selected SR transmission resource having a buffer status report (BSR) and UE ID information.

Example 79 includes the one or more transitory or non-transitory machine readable storage mediums of example 78, further comprising instructions which when executed performs the following: configure a contention based SR transmission region for transmitting the SR message; include in the SR message a DM-RS sequence generated according to a bit sequence generated as a function of the SR message using $a=f(b_{SR})$, where a is the generated bit sequence and $b_{SR}$ is the bit sequence for the SR message, wherein a "Y" bit is selected from a to generate the DM-RS sequence according to the Y bit; or select the SR transmission resource as a function of the DM-RS sequence index, the cell identification (ID) based on the predefined mapping rule, a physical resource block (PRB) index, or a subframe index used for transmitting the SR message based on the predefined mapping rule, wherein predefined mapping rule is a function of the DM-RS sequence index and a cell identification (ID) as $I_{SR}=f(n_{CS}, n_{oc}, n_{cell}^{ID})$, where $n_{cell}^{ID}$ is a physical cell ID, and $I_{SR}=(c_0 \cdot n_{CS}+c_1 \cdot n_{oc}+c_2 \cdot n_{cell}^{ID}+c_3) \mod (N)$, where $c_0$, $c_1$, $c_2$ and $c_3$ are predefined constants predefined or configured by higher layers via master information block (MIB), a system information block (SIB), or a UE-specific dedicated radio resource control layer (RRC) signalling or the predefined mapping rule is a function of the DM-RS sequence index as $I_{SR}=f(I_{DMRS})$, where $I_{SR}$ is a SR transmission resource index, and $I_{SR}=0,1,N-1$, where N is a total number of SR transmission resources in a physical resource block (PRB) pair, and $I_{DMRS}$ is the DM-RS sequence index.

Example 80 includes the one or more transitory or non-transitory machine readable storage mediums of example 78 or 79, further comprising instructions which when executed performs the following: define instances of the SR messages as uplink subframes that satisfy $(10 \times n_f + \lfloor n_s/2 \rfloor - N_{OFFSET, CB\_SR}) \mod CB\_SR_{PERIODICITY}=0$, where $n_f$ and $n_s$ are radio frame number and slot number; $N_{OFFSET, CB\_SR}$ is the contention based SR subframe offset and $CB\_SR_{PERIODICITY}$ is the contention based SR transmission periodicity.

In Example 81, the subject matter of Example 78 or any of the Examples described herein may further include instructions which when executed performs the following: reuse a resource mapping for a physical uplink control channel (PUCCH) format 1, 1a, 1b, 2, 2a, 2b, or 3 for resource mapping the DM-RS for transmitting the SR message, or the DM-RS occupies an orthogonal frequency-division multiplexing (OFDM) symbol #0, #1, #2, #5 and #6 or OFDM symbol #0, #2, #4, and #6 for a normal cyclic prefix (CP) for each slot.

In Example 82, the subject matter of Example 78 or any of the Examples described herein may further include instructions which when executed performs the following: generate a DM-RS sequence by randomly selecting a cyclic shift (CS), an orthogonal cover code (OCC) index, or a combination of the CS and the OCC index; configure the DM-RS sequence index and a cyclic shift (CS), an orthogonal cover code (OCC) index, or a combination of the CS and the OCC index using a UE-specific dedicated radio resource control layer (RRC) signalling; include in the SR message a DM-RS sequence or transmit the DM-RS sequence which carries specified information in the SR message; divide the DM-RS sequence index into a first group indicating a short SR message transmission and second group indicates a long SR message transmission; process, for transmission, the SR message according to a localized SR message transmission or a distributed SR message transmission; or select the SR transmission resource for transmitting the SR message based on the UE-ID, wherein the UE-ID is a cell radio network temporary identifier (C-RNTI).

In Example 83, the subject matter of Example 78 or any of the Examples described herein may further include instructions which when executed performs the following: reuse a physical uplink control channel (PUCCH) format 1a, 1b, 2, 2a, 2b, or 3, as defined by, 3rd generation partnership project (3GPP) long term evolution (LTE) Release 12, for transmitting the SR message.

In Example 84, the subject matter of Example 78 or any of the Examples described herein may further include instructions which when executed performs the following: scramble the UE-ID on at least one or more bits of a cyclic redundancy check (CRC).

Example 85 includes an apparatus of an eNodeB operable for contention based scheduling request (SR) transmission with a user equipment (UE), the apparatus comprising one or more processors and memory configured to: configure a set of configured DM-RS sequences for receiving from the UE a DeModulation Reference Signal (DM-RS); detect the DeModulation Reference Signal (DM-RS), received, from the UE, that is randomly selected from the set of configured DM-RS sequences; process an SR message, received from the UE, having a buffer status report (BSR) and UE ID information on a SR transmission resource selected from a function of a DM-RS sequence index and/or cell identification (ID) based on a predefined mapping rule; and perform coherent decoding of the SR message.

Example 86 includes a device for contention based scheduling request (SR) transmission, the device comprising: means for randomly selecting a DeModulation Reference Signal (DM-RS) sequence from a set of configured DM-RS sequences; means for transmitting the randomly selected DM-RS sequence; means for selecting a SR resource as a function a DM-RS sequence index and/or cell identification (ID) based on a predefined mapping rule; and means for transmitting a SR message on the selected SR transmission resource having a buffer status report (BSR) and UE ID information.

Example 87 includes the device of example 86, further comprising means for configuring a contention based SR transmission region for transmitting the SR message.

Example 88 includes the device of example 86, further comprising means for including in the SR message a DM-RS sequence generated according to a bit sequence generated as a function of the SR message using $a=f(b_{SR})$, where a is the generated bit sequence and $b_{SR}$ is the bit sequence for the SR message, wherein a "Y" bit is selected from a to generate the DM-RS sequence according to the Y bit.

Example 89 includes the device of example 86, further comprising means for selecting the SR transmission resource as a function of the DM-RS sequence index, the cell identification (ID) based on the predefined mapping rule, a physical resource block (PRB) index, or a subframe index used for transmitting the SR message based on the predefined mapping rule.

Example 90 includes the device of example 86, wherein predefined mapping rule is a function of the DM-RS sequence index and a cell identification (ID) as $I_{SR}=f(n_{CS}, n_{oc}, n_{cell}^{ID})$, where $n_{cell}^{ID}$ is a physical cell ID, and $I_{SR}=(c_0 \cdot n_{CS}+c_1 \cdot n_{oc}+c_2 \cdot n_{cell}^{ID}+c_3) \mod(N)$, where $c_0$, $c_1$, $c_2$ and $c_3$ are predefined constants predefined or configured by higher layers via master information block (MIB), a system information block (SIB), or a UE-specific dedicated radio resource control layer (RRC) signalling.

Example 91 includes the device of example 86, wherein predefined mapping rule is a function of the DM-RS sequence index as $I_{SR}=f(I_{DMRS})$, where $I_{SR}$ is a SR transmission resource index, and $I_{SR}=0,1,N-1$, where N is a total number of SR transmission resources in a physical resource block (PRB) pair, and $I_{DMRS}$ is the DM-RS sequence index.

Example 92 includes the device of example 86, further comprising means for defining instances of the SR messages as uplink subframes that satisfy $(10 \times n_f + \lfloor n_s/2 \rfloor - N_{OFFSET,CB\_SR}) \mod CB\_SR_{PERIODICITY} = 0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity.

Example 93 includes the device of example 86, further comprising means for reusing a resource mapping for a physical uplink control channel (PUCCH) format 1, 1a, 1b, 2, 2a, 2b, or 3 for resource mapping the DM-RS for transmitting the SR message.

Example 94 includes the device of example 86, wherein the DM-RS occupies an orthogonal frequency-division multiplexing (OFDM) symbol #0, #1, #2, #5 and #6 or OFDM symbol #0, #2, #4, and #6 for a normal cyclic prefix (CP) for each slot.

Example 95 includes the device of example 86, further comprising means for generating a DM-RS sequence by randomly selecting a cyclic shift (CS), an orthogonal cover code (OCC) index, or a combination of the CS and the OCC index.

Example 96 includes the device of example 86, further comprising means for configuring the DM-RS sequence index and a cyclic shift (CS), an orthogonal cover code (OCC) index, or a combination of the CS and the OCC index using a UE-specific dedicated radio resource control layer (RRC) signalling.

Example 97 includes the device of example 86, further comprising means for including in the SR message a DM-RS sequence.

Example 98 includes the device of example 86, further comprising means for dividing the DM-RS sequence index into a first group indicating a short SR message transmission and second group indicates a long SR message transmission.

Example 99 includes the device of example 86, further comprising means for transmitting the SR message according to a localized SR message transmission or a distributed SR message transmission.

Example 100 includes the device of example 86, further comprising means for reusing a physical uplink control channel (PUCCH) format 1a, 1b, 2, 2a, 2b, or 3, as defined by, 3rd generation partnership project (3GPP) long term evolution (LTE) Release 12, for transmitting the SR message.

Example 101 includes the device of example 86, further comprising means for selecting the SR transmission resource for transmitting the SR message based on the UE-ID, wherein the UE-ID is a cell radio network temporary identifier (C-RNTI).

Example 102 includes the device of example 86, further comprising means for scrambling the UE-ID on at least one or more bits of a cyclic redundancy check (CRC).

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE), the UE configured for contention based scheduling request (SR) transmission, the apparatus comprising one or more processors and memory configured to:

process, for transmission to an enhanced node B (eNB), a DeModulation Reference Signal (DM-RS) that is randomly selected from a set of configured DM-RS sequences or configured by the eNB;

select an SR transmission resource as a function of a DM-RS sequence index or cell identification (ID) based on a predefined mapping rule;

process, for transmission to the eNB, a SR message having a buffer status report (BSR) and UE identification (UE-ID) information on the selected SR transmission resource; and define instances of the SR messages as uplink subframes that satisfy $(10 \times n_f + \lfloor n_s/2 \rfloor - N_{OFFSET,CB\_SR}) \mod CB\_SR_{PERIODICITY} = 0$, where $n_f$ and $n_s$ are radio frame number and slot number; $N_{OFFSET,CB\_SR}$ is a contention based SR subframe offset and $CB\_SR_{PERIODICITY}$ is a contention based SR transmission periodicity.

2. The apparatus of claim 1, wherein the one or more processors and memory are further configured to configure a contention based SR transmission region; wherein the contention based SR transmission region can be configured by higher layers in a cell specific manner via a master information block (MIB), a system information block (SIB), or a UE-specific dedicated radio resource control layer (RRC) signaling, wherein the contention based SR transmission region is located adjacent to a physical uplink control channel (PUCCH) region.

3. The apparatus of claim 1, wherein the one or more processors and memory are further configured to use inter-slot hopping for transmitting the SR message.

4. The apparatus of claim 1, wherein the one or a processors and memory are further configured to reuse a resource mapping for a physical uplink control channel (PUCCH) format 1, 1a, 1b, 2, 2a, 2b, or 3, as defined by $3^{rd}$ generation partnership project (3GPP) long term evolution (LTE) Release 12, for resource mapping the DM-RS for transmitting the SR message.

5. The apparatus of claim 1, wherein the DM-RS occupies an orthogonal frequency-division multiplexing (OFDM) symbol #0, #1, #2, #5 and #6 for a normal cyclic prefix (CP) for each slot.

6. The apparatus of claim 1, wherein the DM-RS occupies an orthogonal frequency-division multiplexing (OFDM) symbol #0, #2, #4, and #6 for a normal cyclic prefix (CP) for each slot.

7. The apparatus of claim 1, wherein the one or more processors and memory are further configured to generate a DM-RS sequence by randomly selecting a cyclic shift (CS), an orthogonal cover code (OCC) index, or a combination of the CS and the OCC index, wherein a subset of the DMRS sequence is configured by the eNB using a master information block (MIB), a system information block (SIB), or UE-specific dedicated radio resource control layer (RRC) signaling.

8. The apparatus of claim 1, wherein the one or more processors and memory are further configured to configure the DM-RS sequence index and a cyclic shift (CS), an orthogonal cover code (OCC) index, or a combination of the CS and the OCC index in a UE specific manner using a UE-specific dedicated radio resource control layer (RRC) signaling.

9. The apparatus of claim 1, wherein the one or more processors and memory are further configured to include in the SR message a DM-RS sequence or transmit the DM-RS sequence which carries specified information in the SR message.

10. The apparatus of claim 1, wherein the one or more processors and memory are further configured to divide the DM-RS sequence index into a first group indicating a short SR message transmission and second group indicates a long SR message transmission.

11. The apparatus of claim 1, wherein the one or more processors and memory are further configured to process, for transmission, the SR message according to a localized SR message transmission or a distributed SR message transmission, wherein the localized SR message transmission and the distributed SR message are predefined via a master information block (MIB), a system information block (SIB), or a UE-specific dedicated radio resource control layer (RRC) signaling.

12. The apparatus of claim 1, wherein the one or more processors and memory are further configured to reuse a physical uplink control channel (PUCCH) format 1a, 1b, 2, 2a, 2b, or 3, as defined by $3^{rd}$ generation partnership project (3GPP) long term evolution (LTE) Release 12, for transmitting the SR message.

13. The apparatus of claim 1, wherein the one or more processors and memory are further configured to select the SR transmission resource for transmitting the SR message based on the UE-ID.

14. The apparatus of claim 1, wherein the one or more processors and memory are further configured to scramble the UE-ID on at least one or more bits of a cyclic redundancy check (CRC).

15. At least one non-transitory machine readable storage medium having instructions embodied thereon for contention based scheduling request (SR) transmission of a user equipment (UE), the instructions when executed perform the following:
   randomly select a DeModulation Reference Signal (DM-RS) sequence from a set of configured DM-RS sequences;
   process, for transmission, the randomly selected DM-RS sequence;
   select a SR transmission resource as a function a DM-RS sequence index and/or cell identification (ID) based on a predefined mapping rule;
   process, for transmission, an SR message on the selected SR transmission resource having a buffer status report (BSR) and UE ID information; and
   include in the SR message a DM-RS sequence generated according to a bit sequence generated as a function of the SR message using $a=f(b_{SR})$, where a is the generated bit sequence and $b_{SR}$ is the bit sequence for the SR message, wherein a "Y" bit is selected from a to generate the DM-RS sequence according to the Y bit.

16. The at least one non-transitory machine readable storage medium of claim 15, further comprising instructions which when executed performs the following: configure a contention based SR transmission region for transmitting the SR message.

17. The at least one machine readable storage medium of claim 15, further comprising instructions which when executed performs the following: select the SR transmission resource as a function of the DM-RS sequence index, the cell identification (ID) based on the predefined mapping rule, a physical resource block (PRB) index, or a subframe index used for transmitting the SR message based on the predefined mapping rule.

18. The at least one non-transitory machine readable storage medium of claim 15, wherein predefined mapping rule is a function of the DM-RS sequence index and a cell identification (ID) as $I_{SR}=f(n_{CS}, n_{oc}, n_{cell}^{ID})$, where $n_{cell}^{ID}$ is a physical cell ID, and $I_{SR}=(c_0 \cdot n_{CS}+c_1 \cdot n_{oc}+c_2 \cdot n_{cell}^{ID}+c_3) \bmod (N)$, where $c_0$, $c_1$, $c_2$ and $c_3$ are predefined constants predefined or configured by higher layers via master information block (MIB), a system information block (SIB), or a UE-specific dedicated radio resource control layer (RRC) signaling.

19. The at least one non-transitory machine readable storage medium of claim 15, wherein predefined mapping rule is a function of the DM-RS sequence index as $I_{SR}=f(I_{DMRS})$, where $I_{SR}$ is a SR transmission resource index, and $I_{SR}=0,1,N-1$, where N is a total number of SR transmission resources in a physical resource block (PRB) pair, and $I_{DMRS}$ is the DM-RS sequence index.

20. The at least one machine non-transitory readable storage medium of claim 15, further comprising instructions which when executed performs the following: define instances of the SR messages as uplink subframes that satisfy $(10 \times n_f+\lfloor n_s/2 \rfloor-N_{OFFSET,CB\_SR}) \bmod CB\_SR_{PERIODICITY}=0$, where $n_f$ and $n_s$ are radio frame number and slot number; $N_{OFFSET,CB\_SR}$ is the contention based SR subframe offset and $CB\_SR_{PERIODICITY}$ is the contention based SR transmission periodicity.

21. The at least one non-transitory machine readable storage medium of claim 15, further comprising instructions which when executed performs the following: reuse a resource mapping for a physical uplink control channel (PUCCH) format 1, 1a, 1b, 2, 2a, 2b, or 3 for resource mapping the DM-RS for transmitting the SR message.

22. The at least one non-transitory machine readable storage medium of claim 15, wherein the DM-RS occupies an orthogonal frequency-division multiplexing (OFDM) symbol #0, #1, #2, #5 and #6 or OFDM symbol #0, #2, #4, and #6 for a normal cyclic prefix (CP) for each slot.

23. The at least one non-transitory machine readable storage medium of claim 15, further comprising instructions which when executed performs the following: generate a DM-RS sequence by randomly selecting a cyclic shift (CS), an orthogonal cover code (OCC) index, or a combination of the CS and the OCC index.

24. The at least one non-transitory machine readable storage medium of claim 15, further comprising instructions which when executed performs the following: configure the DM-RS sequence index and a cyclic shift (CS), an orthogonal cover code (OCC) index, or a combination of the CS and the OCC index using a UE-specific dedicated radio resource control layer (RRC) signaling.

25. The at least one non-transitory machine readable storage medium of claim 15, further comprising instructions which when executed performs the following:
   include in the SR message a DM-RS sequence or transmit the DM-RS sequence which carries specified information in the SR message;
   divide the DM-RS sequence index into a first group indicating a short SR message transmission and second group indicates a long SR message transmission;
   process, for transmission, the SR message according to a localized SR message transmission or a distributed SR message transmission;
   reuse a physical uplink control channel (PUCCH) format 1a, 1b, 2, 2a, 2b, or 3, as defined by, $3^{rd}$ generation partnership project (3GPP) long term evolution (LTE) Release 12, for transmitting the SR message;
   select the SR transmission resource for transmitting the SR message based on the UE-ID, wherein the UE-ID is a cell radio network temporary identifier (C-RNTI), or
   scramble the UE-ID on at least one or more bits of a cyclic redundancy check (CRC).

26. An apparatus of an eNodeB operable for contention based scheduling request (SR) transmission with a user equipment (UE), the apparatus comprising one or more processors and memory configured to:
   configure a set of configured DM-RS sequences for receiving from the UE a DeModulation Reference Signal (DM-RS);
   detect the DeModulation Reference Signal (DM-RS), received, from the UE, that is randomly selected from the set of configured DM-RS sequences;

process an SR message, received from the UE, having a buffer status report (BSR) and UE ID information on a SR transmission resource selected from a function of a DM-RS sequence index or a cell identification (ID) based on a predefined mapping rule;

wherein the predefined mapping rule is a function of the DM-RS sequence index as $I_{SR}=f(I_{DMRS})$, where $I_{SR}$ is a SR transmission resource index, and $I_{SR}=0,1,N-1$, where N is a total number of SR transmission resources in a physical resource block (PRB) pair, and $I_{DMRS}$ is the DM-RS sequence index; and perform coherent decoding of the SR message.

27. The apparatus of claim 26, wherein the one or more processors and memory are further configured to process the SR message, received from the UE, wherein the SR message includes a buffer status report (BSR) and UE identification (UE-ID) information on the selected SR transmission resource.

* * * * *